(12) United States Patent
Winig et al.

(10) Patent No.: US 12,021,848 B2
(45) Date of Patent: *Jun. 25, 2024

(54) SATELLITE OPERATIONS WITH SECURE ENCLAVE FOR SECURE HOSTED PAYLOAD OPERATIONS

(71) Applicant: The Boeing Company, Chicago, IL (US)

(72) Inventors: Robert J. Winig, Rancho Palos Verdes, CA (US); Yi-Feng J. Chen, Irvine, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,231

(22) Filed: May 10, 2023

(65) Prior Publication Data
US 2023/0275878 A1 Aug. 31, 2023

Related U.S. Application Data

(63) Continuation of application No. 17/474,992, filed on Sep. 14, 2021, now Pat. No. 11,689,509.

(51) Int. Cl.
*H04L 9/40* (2022.01)
*H04L 5/00* (2006.01)
*H04W 12/03* (2021.01)

(52) U.S. Cl.
CPC ........ *H04L 63/0428* (2013.01); *H04L 5/0044* (2013.01); *H04W 12/03* (2021.01)

(58) Field of Classification Search
CPC ....... H04W 12/03; H04W 4/40; H04W 84/06; H04B 7/18565; H04L 63/0428; H04L 5/0044; H04L 63/0272; H04L 67/12
USPC ........................................................ 713/168
See application file for complete search history.

(56) References Cited

U.S. PATENT DOCUMENTS

| 5,594,454 A | 1/1997 | Devereaux et al. |
| 7,673,338 B1 * | 3/2010 | Osburn, III ............. H04L 67/34 713/153 |
| 7,751,779 B2 | 7/2010 | Ho et al. |
| 7,856,294 B2 | 12/2010 | Van Gaasbeck et al. |

(Continued)

*Primary Examiner* — Amare F Tabor
(74) *Attorney, Agent, or Firm* — Haynes and Boone, LLP

(57) ABSTRACT

Systems, methods, and apparatus for satellite operations with a secure enclave for secure hosted payload operations are disclosed. In one or more embodiments, a disclosed method for payload operations comprises receiving, by a command receiver on a vehicle (e.g., a satellite), host commands from a host spacecraft operations center (SOC). The method further comprises reconfiguring a host payload on the vehicle according to the host commands. Also the method comprises transmitting, by a telemetry transmitter on the vehicle, host payload telemetry to the host SOC. In addition, the method comprises receiving, by a payload antenna on the vehicle, hosted commands from a secure enclave of the host SOC. Additionally, the method comprises reconfiguring a hosted payload on the vehicle according to the hosted commands. Further, the method comprises transmitting, by the payload antenna, host payload data, hosted payload data, and hosted telemetry to the secure enclave of the host SOC.

20 Claims, 10 Drawing Sheets

(56) References Cited

U.S. PATENT DOCUMENTS

| | | | | |
|---|---|---|---|---|
| 8,331,563 | B2* | 12/2012 | Healy | H04L 9/0894 |
| | | | | 380/255 |
| 11,616,767 | B2* | 3/2023 | Helmick | H04L 9/14 |
| | | | | 713/193 |
| 2006/0145024 | A1 | 7/2006 | Kosmas | |
| 2009/0043362 | A1* | 2/2009 | Healy | A61N 1/37254 |
| | | | | 607/60 |
| 2013/0110008 | A1* | 5/2013 | Bourget | H04W 12/33 |
| | | | | 600/595 |
| 2019/0147188 | A1* | 5/2019 | Benaloh | G06F 21/6245 |
| | | | | 726/26 |
| 2020/0244631 | A1* | 7/2020 | Chen | H04B 7/18513 |
| 2020/0322319 | A1* | 10/2020 | Chen | H04B 7/18513 |
| 2021/0226932 | A1* | 7/2021 | Winig | H04L 9/14 |

* cited by examiner

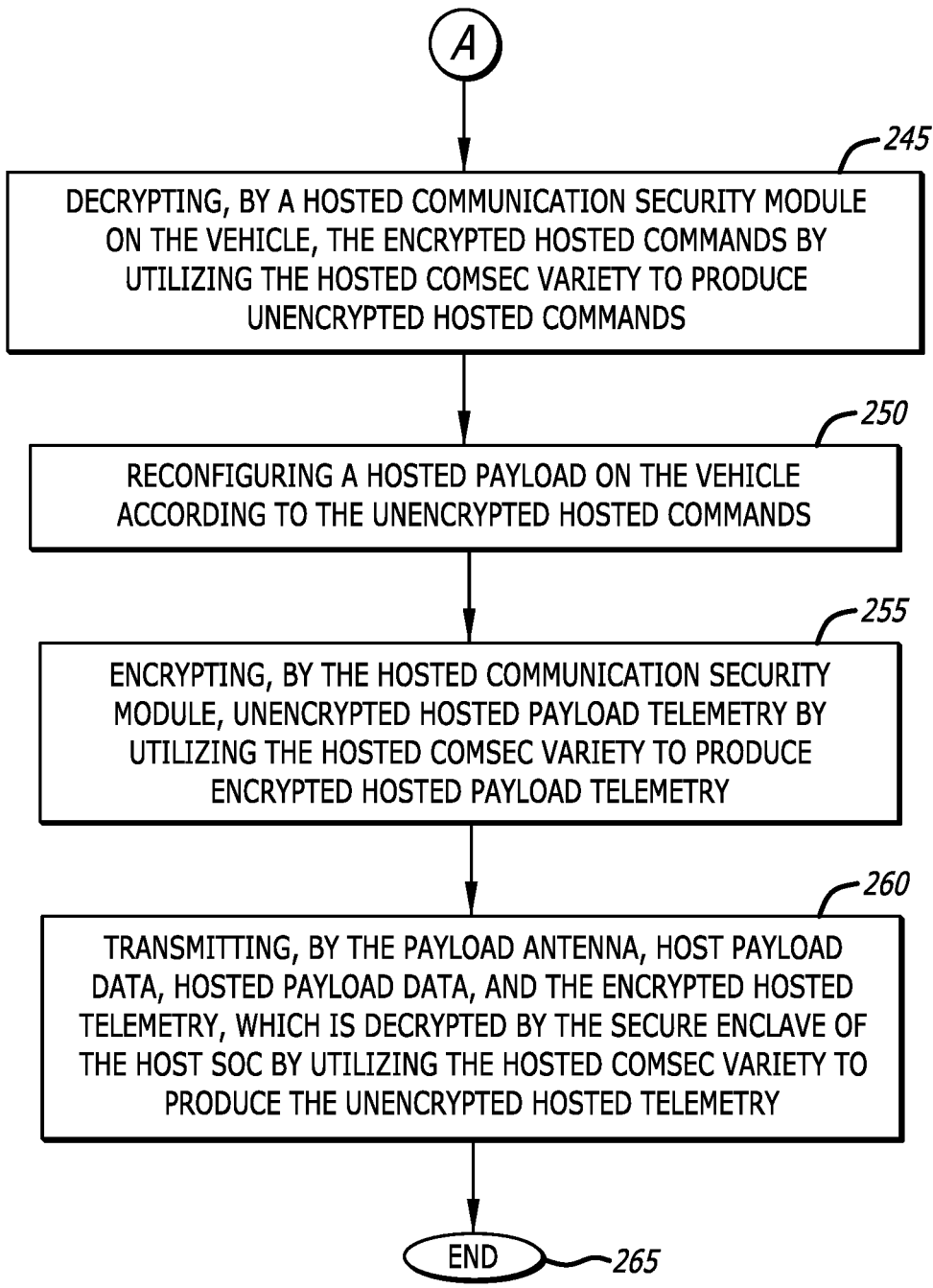

| Scenario No. | Host CMD | Host TLM | Hosted CMD | Hosted TLM | Secure Enclave CMD Inband | Secure Enclave TLM Inband |
|---|---|---|---|---|---|---|
| 1 | Outband | Outband | | | via Host Payload | via Host Payload |
| 2 | Outband | Outband | | | via Host Payload | via Hosted Payload |
| 3 | Outband | Outband | | | via Hosted Payload | via Host Payload |
| 4 | Outband | Outband | | | via Hosted Payload | via Hosted Payload |
| 5 | Outband | Inband | | | via Host Payload | via Host Payload |
| 6 | Outband | Inband | | | via Host Payload | via Hosted Payload |
| 7 | Outband | Inband | | | via Hosted Payload | via Host Payload |
| 8 | Outband | Inband | | | via Hosted Payload | via Hosted Payload |
| 9 | Inband | Outband | | | via Host Payload | via Host Payload |
| 10 | Inband | Outband | | | via Host Payload | via Hosted Payload |
| 11 | Inband | Outband | | | via Hosted Payload | via Host Payload |
| 12 | Inband | Outband | | | via Hosted Payload | via Hosted Payload |
| 13 | Inband | Inband | | | via Host Payload | via Host Payload |
| 14 | Inband | Inband | | | via Host Payload | via Hosted Payload |
| 15 | Inband | Inband | | | via Hosted Payload | via Host Payload |
| 16 | Inband | Inband | | | via Hosted Payload | via Hosted Payload |
| 17 | Outband | Outband | Outband | Outband | | via Hosted Payload |
| 18 | Outband | Outband | Outband | Inband | | via Hosted Payload |
| 19 | Outband | Outband | Inband | Outband | | via Hosted Payload |
| 20 | Outband | Outband | Inband | Inband | | via Hosted Payload |
| 21 | Outband | Inband | Outband | Outband | | via Hosted Payload |
| 22 | Outband | Inband | Outband | Inband | | via Hosted Payload |
| 23 | Outband | Inband | Inband | Outband | | via Hosted Payload |
| 24 | Outband | Inband | Inband | Inband | | via Hosted Payload |
| 25 | Inband | Outband | Outband | Outband | | via Hosted Payload |
| 26 | Inband | Outband | Outband | Inband | | via Hosted Payload |
| 27 | Inband | Outband | Inband | Outband | | via Hosted Payload |
| 28 | Inband | Outband | Inband | Inband | | via Hosted Payload |
| 29 | Inband | Inband | Outband | Outband | | via Hosted Payload |
| 30 | Inband | Inband | Outband | Inband | | via Hosted Payload |
| 31 | Inband | Inband | Inband | Outband | | via Hosted Payload |
| 32 | Inband | Inband | Inband | Inband | | via Hosted Payload |

FIG. 5A

| Scenario No. | Host CMD | Host TLM | Hosted CMD | Hosted TLM | Secure Enclave CMD Inband | Secure Enclave TLM Inband |
|---|---|---|---|---|---|---|
| 33 | Outband | Outband |  | Outband | via Host Payload |  |
| 34 | Outband | Outband |  | Inband | via Hosted Payload |  |
| 35 | Outband | Outband |  | Outband | via Hosted Payload |  |
| 36 | Outband | Outband |  | Inband | via Host Payload |  |
| 37 | Outband | Inband |  | Outband | via Host Payload |  |
| 38 | Outband | Inband |  | Inband | via Hosted Payload |  |
| 39 | Outband | Inband |  | Outband | via Hosted Payload |  |
| 40 | Outband | Inband |  | Inband | via Host Payload |  |
| 41 | Inband | Outband |  | Outband | via Host Payload |  |
| 42 | Inband | Outband |  | Inband | via Hosted Payload |  |
| 43 | Inband | Outband |  | Outband | via Hosted Payload |  |
| 44 | Inband | Outband |  | Inband | via Host Payload |  |
| 45 | Inband | Inband |  | Outband | via Host Payload |  |
| 46 | Inband | Inband |  | Inband | via Hosted Payload |  |
| 47 | Inband | Inband |  | Outband | via Hosted Payload |  |
| 48 | Inband | Inband |  | Inband | via Host Payload |  |

*FIG. 5B*

SATELLITE OPERATIONS WITH SECURE ENCLAVE FOR SECURE HOSTED PAYLOAD OPERATIONS

CROSS-REFERENCE TO RELATED APPLICATIONS

The present application is a continuation of U.S. patent application Ser. No. 17/474,992 filed Sep. 14, 2021 entitled "SATELLITE OPERATIONS WITH SECURE ENCLAVE FOR SECURE HOSTED PAYLOAD OPERATIONS" which is hereby incorporated by reference in its entirety.

FIELD

The present disclosure relates to payload operations. In particular, it relates to satellite operations with a secure enclave for secure hosted payload operations.

BACKGROUND

Currently, typical payload operations for a vehicle (e.g., a satellite) have the ability to perform switching of inputs to outputs of the payload on the vehicle. All of this switching on the payload is commanded and controlled by a single satellite controller with no resource allocation privacy.

As such, there is a need for an improved payload operations design that allows for privacy in the allocation of resources on the payload.

SUMMARY

The present disclosure relates to a method, system, and apparatus for satellite operations with a secure enclave for secure hosted payload operations. In one or more embodiments, a method for payload operations comprises receiving, by a command receiver on a vehicle, encrypted host commands, which are host commands encrypted by a host spacecraft operations center (SOC) utilizing a host communication security (COMSEC) variety. The method further comprises decrypting, by a host communication security module on the vehicle, the encrypted host commands by utilizing the host COMSEC variety to produce unencrypted host commands. Also, the method comprises reconfiguring a host payload on the vehicle according to the unencrypted host commands. In addition, the method comprises encrypting, by the host communication security module, unencrypted host payload telemetry by utilizing the host COMSEC variety to produce encrypted host payload telemetry. Additionally, the method comprises transmitting, by a telemetry transmitter on the vehicle, the encrypted host payload telemetry to the host SOC, which decrypts the encrypted host payload telemetry by utilizing the host COMSEC variety to produce the unencrypted host payload telemetry.

Also, the method comprises receiving, by a payload antenna on the vehicle, encrypted hosted commands, which are hosted commands encrypted by a secure enclave of the host SOC by utilizing a hosted COMSEC variety. In addition, the method comprises decrypting, by a hosted communication security module on the vehicle, the encrypted hosted commands by utilizing the hosted COMSEC variety to produce unencrypted hosted commands. In addition, the method comprises reconfiguring a hosted payload on the vehicle according to the unencrypted hosted commands. Also, the method comprises encrypting, by the hosted communication security module, unencrypted hosted payload telemetry by utilizing the hosted COMSEC variety to produce encrypted hosted payload telemetry. Further, the method comprises transmitting, by the payload antenna, host payload data, hosted payload data, and the encrypted hosted telemetry, which is decrypted by the secure enclave of the host SOC by utilizing the hosted COMSEC variety to produce the unencrypted hosted telemetry.

In one or more embodiments, a combined host/hosted payload on the vehicle comprises the host payload and the hosted payload. In at least one embodiment, the payload antenna receives a full set of the encrypted hosted commands from the host gateway antenna or the hosted gateway antenna. In some embodiments, the payload antenna receives a full set of the encrypted hosted commands from each of the host gateway antenna and the hosted gateway antenna. In at least one embodiment, the payload antenna receives a portion of a full set of the encrypted hosted commands from the host gateway antenna, and receives a remaining portion of the full set of the encrypted hosted commands from the hosted gateway antenna.

In at least one embodiment, the payload antenna receives the encrypted hosted commands from the secure enclave of the host SOC via a secure terrestrial link and a host gateway antenna and/or a hosted gateway antenna. In some embodiments, the payload antenna transmits the encrypted hosted telemetry to the secure enclave of the host SOC via a secure terrestrial link and a host gateway antenna and/or a hosted gateway antenna.

In one or more embodiments, the reconfiguring of the host payload or the hosted payload comprises adjusting transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, and/or beam steering.

In at least one embodiment, the reconfiguring of the host payload comprises reconfiguring at least a portion of the payload antenna, at least one analog-to-digital converter, at least one digital-to-analog converter, at least one beamformer, at least one digital channelizer, at least one demodulator, at least one modulator, at least one digital switch matrix, at least one digital combiner, and/or at least one analog switch matrix.

In one or more embodiments, the reconfiguring of the hosted payload comprises reconfiguring at least a portion of the payload antenna, at least one analog-to-digital converter, at least one digital-to-analog converter, at least one beamformer, at least one digital channelizer, at least one demodulator, at least one modulator, at least one digital switch matrix, at least one digital combiner, and/or at least one analog switch matrix.

In at least one embodiment, a method for payload operations comprises receiving, by a command receiver on the vehicle, encrypted host commands, which are host commands encrypted by a host SOC utilizing a host COMSEC variety. The method further comprises decrypting, by a host communication security module on the vehicle, the encrypted host commands by utilizing the host COMSEC variety to produce unencrypted host commands. Also, the method comprises commanding, by a host processor, a hosted payload on the vehicle "on" or "off" according to the unencrypted host commands. In addition, the method comprises reconfiguring a host payload on the vehicle according to the unencrypted host commands. Additionally, the method comprises encrypting, by the host communication security module, unencrypted host payload telemetry by utilizing the host COMSEC variety to produce encrypted host payload telemetry. Also, the method comprises transmitting, by a telemetry transmitter on the vehicle, the encrypted host payload telemetry to the host SOC, which decrypts the encrypted host payload telemetry by utilizing the host COMSEC variety to produce the unencrypted host payload telemetry.

In addition, the method comprises receiving, by a host payload antenna and/or a hosted payload antenna on the vehicle, encrypted hosted commands, which are hosted commands encrypted by a secure enclave of the host SOC by utilizing a hosted COMSEC variety. Also, the method comprises decrypting, by a hosted communication security module on the vehicle, the encrypted hosted commands by utilizing the hosted COMSEC variety to produce unencrypted hosted commands. Additionally, the method comprises reconfiguring the hosted payload on the vehicle according to the unencrypted hosted commands. In addition, the method comprises encrypting, by the hosted communication security module, unencrypted hosted payload telemetry by utilizing the hosted COMSEC variety to produce encrypted hosted payload telemetry. Further, the method comprises transmitting, by the host payload antenna and/or the hosted payload antenna, the encrypted hosted telemetry, which is decrypted by the secure enclave of the host SOC by utilizing the hosted COMSEC variety to produce the unencrypted hosted telemetry.

In one or more embodiments, the method further comprises transmitting, by the host payload antenna on the vehicle, host payload data; and transmitting, by the hosted payload antenna on the vehicle, hosted payload data.

In at least one embodiment, the host payload antenna and/or the hosted payload antenna receives the encrypted hosted commands from the secure enclave of the host SOC via a secure terrestrial link and a host gateway antenna and/or a hosted gateway antenna. In some embodiments, the host payload antenna and/or the hosted payload antenna transmits the encrypted hosted telemetry to the secure enclave of the host SOC via a secure terrestrial link and a host gateway antenna and/or a hosted gateway antenna.

In one or more embodiments, the reconfiguring of the host payload comprises reconfiguring the host payload antenna, at least one analog-to-digital converter, at least one digital-to-analog converter, at least one beamformer, at least one digital channelizer, at least one demodulator, at least one modulator, at least one digital switch matrix, at least one digital combiner, and/or at least one analog switch matrix.

In at least one embodiment, the reconfiguring of the hosted payload comprises reconfiguring the hosted payload antenna, at least one analog-to-digital converter, at least one digital-to-analog converter, at least one beamformer, at least one digital channelizer, at least one demodulator, at least one modulator, at least one digital switch matrix, at least one digital combiner, and/or at least one analog switch matrix.

In one or more embodiments, a system for payload operations comprises a command receiver on a vehicle configured to receive encrypted host commands, which are host commands encrypted by a host SOC utilizing a host COMSEC variety. The system further comprises a host communication security module on the vehicle configured to decrypt the encrypted host commands by utilizing the host COMSEC variety to produce unencrypted host commands, and configured to encrypt unencrypted host payload telemetry by utilizing the host COMSEC variety to produce encrypted host payload telemetry. Also, the system comprises a host payload on the vehicle configured to be reconfigured according to the unencrypted host commands. In addition, the system comprises a telemetry transmitter on the vehicle configured to transmit the encrypted host payload telemetry to the host SOC, which decrypts the encrypted host payload telemetry by utilizing the host COMSEC variety to produce the unencrypted host payload telemetry.

Additionally, the system comprises a payload antenna on the vehicle configured to receive encrypted hosted commands, which are hosted commands encrypted by a secure enclave of the host SOC by utilizing a hosted COMSEC variety. Also, the system comprises a hosted communication security module on the vehicle configured to decrypt the encrypted hosted commands by utilizing the hosted COMSEC variety to produce unencrypted hosted commands, and configured to encrypt unencrypted hosted payload telemetry by utilizing the hosted COMSEC variety to produce encrypted hosted payload telemetry. In addition, the system comprises a hosted payload on the vehicle configured to be reconfigured according to the unencrypted hosted commands. Additionally, the payload antenna is further configured to transmit host payload data, hosted payload data, and the encrypted hosted telemetry, which is decrypted by the secure enclave of the host SOC by utilizing the hosted COMSEC variety to produce the unencrypted hosted telemetry.

In at least one embodiment, the payload antenna is further configured to receive the encrypted hosted commands from the secure enclave of the host SOC via a secure terrestrial link and a host gateway antenna and/or a hosted gateway antenna. In some embodiments, the payload antenna is further configured to transmit the encrypted hosted telemetry to the secure enclave of the host SOC via a secure terrestrial link and a host gateway antenna and/or a hosted gateway antenna.

In one or more embodiments, a system for payload operations comprises a command receiver on the vehicle configured to receive encrypted host commands, which are host commands encrypted by a host SOC utilizing a host COMSEC variety. The system further comprises a host communication security module on the vehicle configured to decrypt the encrypted host commands by utilizing the host COMSEC variety to produce unencrypted host commands, and configured to encrypt unencrypted host payload telemetry by utilizing the host COMSEC variety to produce encrypted host payload telemetry. Also, the system comprises a host processor configured to command a hosted payload on the vehicle "on" or "off" according to the unencrypted host commands. In addition, the system comprises a host payload on the vehicle configured to be reconfigured according to the unencrypted host commands. Also, the system comprises a telemetry transmitter on the vehicle configured to transmit the encrypted host payload telemetry to the host SOC, which decrypts the encrypted host payload telemetry by utilizing the host COMSEC variety to produce the unencrypted host payload telemetry.

In addition, the system comprises a host payload antenna and/or a hosted payload antenna on the vehicle configured to receive encrypted hosted commands, which are hosted commands encrypted by a secure enclave of the host SOC by utilizing a hosted COMSEC variety. Also, the system comprises a hosted communication security module on the vehicle to decrypt the encrypted hosted commands by utilizing the hosted COMSEC variety to produce unencrypted hosted commands, and to encrypt unencrypted hosted payload telemetry by utilizing the hosted COMSEC variety to produce encrypted hosted payload telemetry. In addition, the system comprises the hosted payload on the vehicle configured to be reconfigured according to the unencrypted hosted commands. Further, the host payload antenna and/or the hosted payload antenna is further configured to transmit the encrypted hosted telemetry, which is decrypted by the secure enclave of the host SOC by utilizing the hosted COMSEC variety to produce the unencrypted hosted telemetry.

In at least one embodiment, the host payload antenna and/or the hosted payload antenna is further configured to receive the encrypted hosted commands from the secure enclave of the host SOC via a secure terrestrial link and a host gateway antenna and/or a hosted gateway antenna. In some embodiments, the host payload antenna and/or the hosted payload antenna is further configured to transmit the encrypted hosted telemetry to the secure enclave of the host SOC via a secure terrestrial link and a host gateway antenna and/or a hosted gateway antenna.

In one or more embodiments, a method for payload operations comprises receiving, by a secure enclave within a host SOC, at least one request comprising service specifications from a hosted user. The method further comprises generating, by the secure enclave, unencrypted hosted commands according to the service specifications. Also, the method comprises encrypting, by the secure enclave, the unencrypted hosted commands by utilizing a hosted COMSEC variety to produce encrypted hosted commands. In addition, the method comprises transmitting, by the secure enclave, the encrypted hosted commands to a payload antenna on a vehicle via a secure terrestrial link, and a host gateway antenna and/or a hosted gateway antenna. In one or more embodiments, on the vehicle, the encrypted hosted commands are unencrypted utilizing the hosted COMSEC variety to produce the unencrypted hosted commands, a hosted portion of a host/hosted payload is reconfigured according to the unencrypted hosted commands, unencrypted hosted telemetry associated with the hosted portion of the host/hosted payload is encrypted utilizing the hosted COMSEC variety to produce encrypted hosted telemetry, and the encrypted hosted telemetry is transmitted by the payload antenna. Also, the method comprises receiving, by the secure enclave, the encrypted hosted telemetry from the payload antenna via a secure terrestrial link, and the host gateway antenna and/or the hosted gateway antenna. Further, the method comprises decrypting, by the secure enclave, the encrypted hosted telemetry utilizing the hosted COMSEC variety to produce unencrypted hosted telemetry.

In at least one embodiment, a method for payload operations comprises receiving, by a secure enclave within a host SOC, at least one request comprising service specifications from a hosted user. The method further comprises generating, by the secure enclave, unencrypted hosted commands according to the service specifications. Also, the method comprises encrypting, by the secure enclave, the unencrypted hosted commands by utilizing a hosted COMSEC variety to produce encrypted hosted commands. In addition, the method comprises transmitting, by the secure enclave, the encrypted hosted commands to a host payload antenna and/or a hosted payload antenna on a vehicle via a secure terrestrial link, and a host gateway antenna and/or a hosted gateway antenna. In one or more embodiments, on the vehicle, the encrypted hosted commands are unencrypted utilizing the hosted COMSEC variety to produce the unencrypted hosted commands, a hosted payload is reconfigured according to the unencrypted hosted commands, unencrypted hosted telemetry associated with the hosted payload is encrypted utilizing the hosted COMSEC variety to produce encrypted hosted telemetry, and the encrypted hosted telemetry is transmitted by the host payload antenna and/or the hosted payload antenna. Also, the method comprises receiving, by the secure enclave, the encrypted hosted telemetry from the host payload antenna and/or the host payload antenna via a secure terrestrial link, and the host gateway antenna and/or the hosted gateway antenna. Further, the method comprises decrypting, by the secure enclave, the encrypted hosted telemetry utilizing the hosted COMSEC variety to produce unencrypted hosted telemetry.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 1 is a diagram showing the disclosed system for satellite operations with a secure enclave for secure hosted payload operations for a combined host/hosted payload, where the host commands and telemetry are transmitted out-of-band, and the hosted commands and telemetry are transmitted inband, in accordance with at least one embodiment of the present disclosure.

FIGS. 2A and 2B together show a flow chart for the disclosed method for satellite operations with a secure enclave for secure hosted payload operations for a combined host/hosted payload, where the host commands and telemetry are transmitted out-of-band, and the hosted commands and telemetry are transmitted inband, in accordance with at least one embodiment of the present disclosure.

Figure 4A:
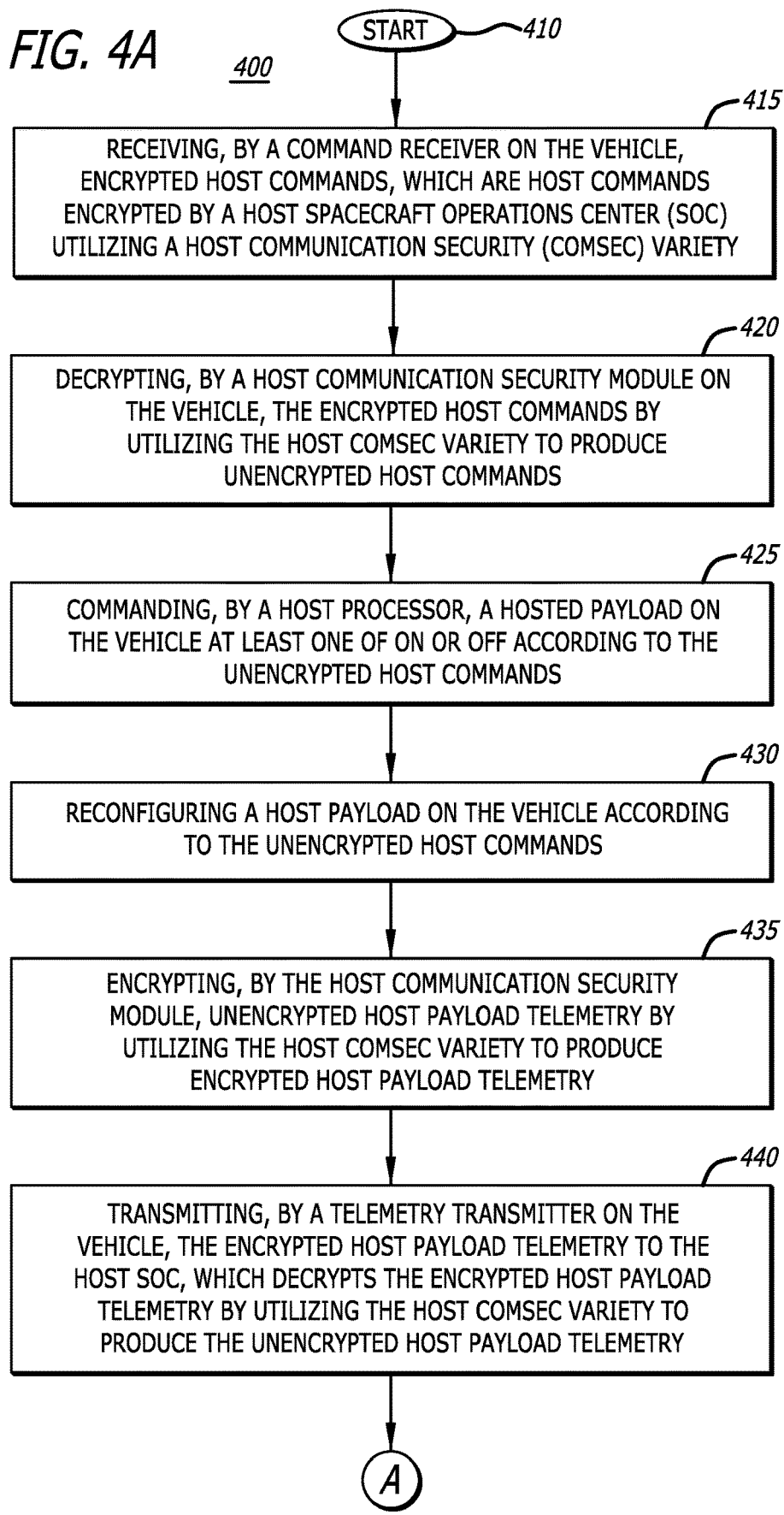
Figure 4B:
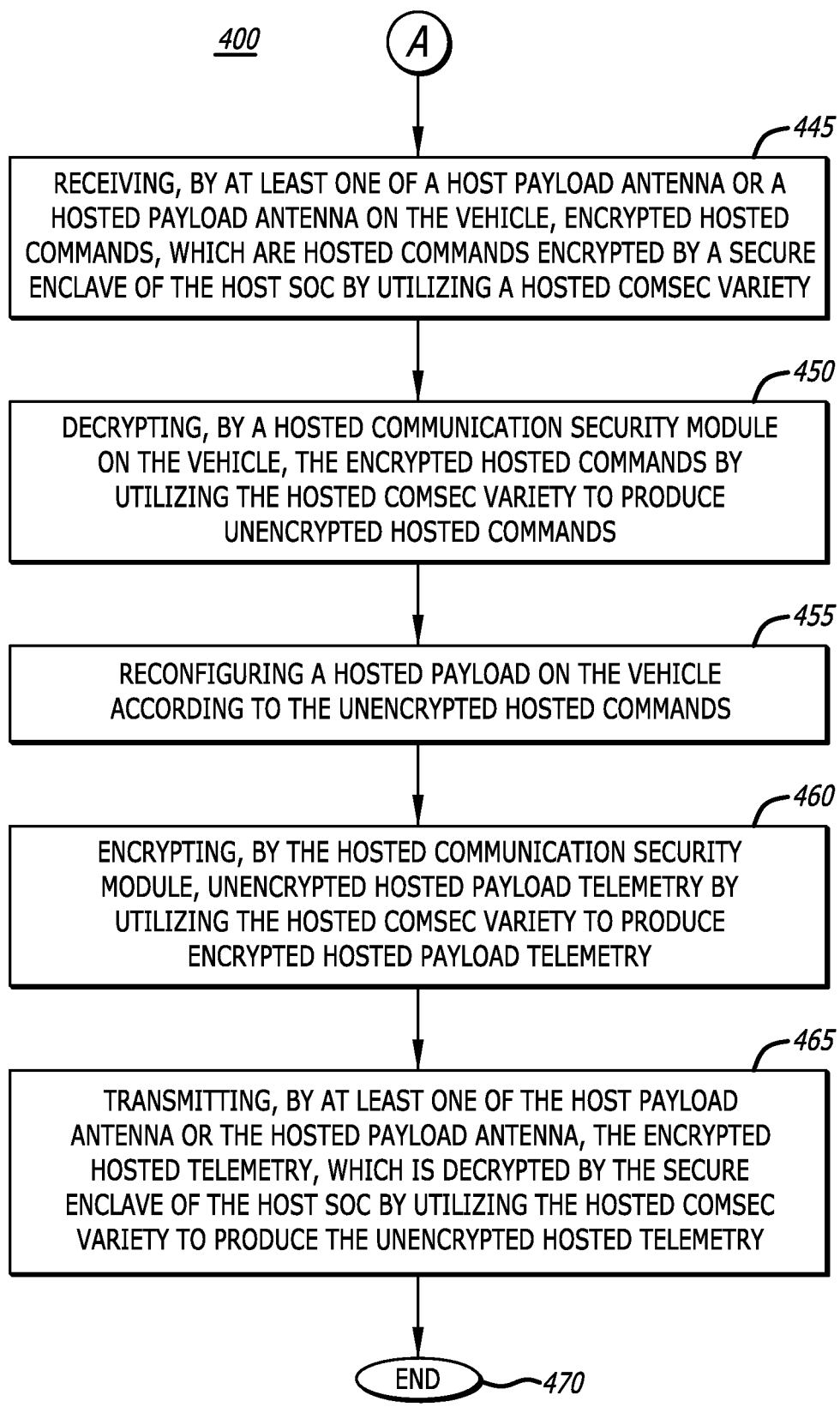

FIGS. 4A and 4B together show a flow chart for the disclosed method for satellite operations with a secure enclave for secure hosted payload operations for separate host and hosted payloads, where the host commands and telemetry are transmitted out-of-band, and the hosted commands and telemetry are transmitted inband, in accordance with at least one embodiment of the present disclosure.

Figure 4C:
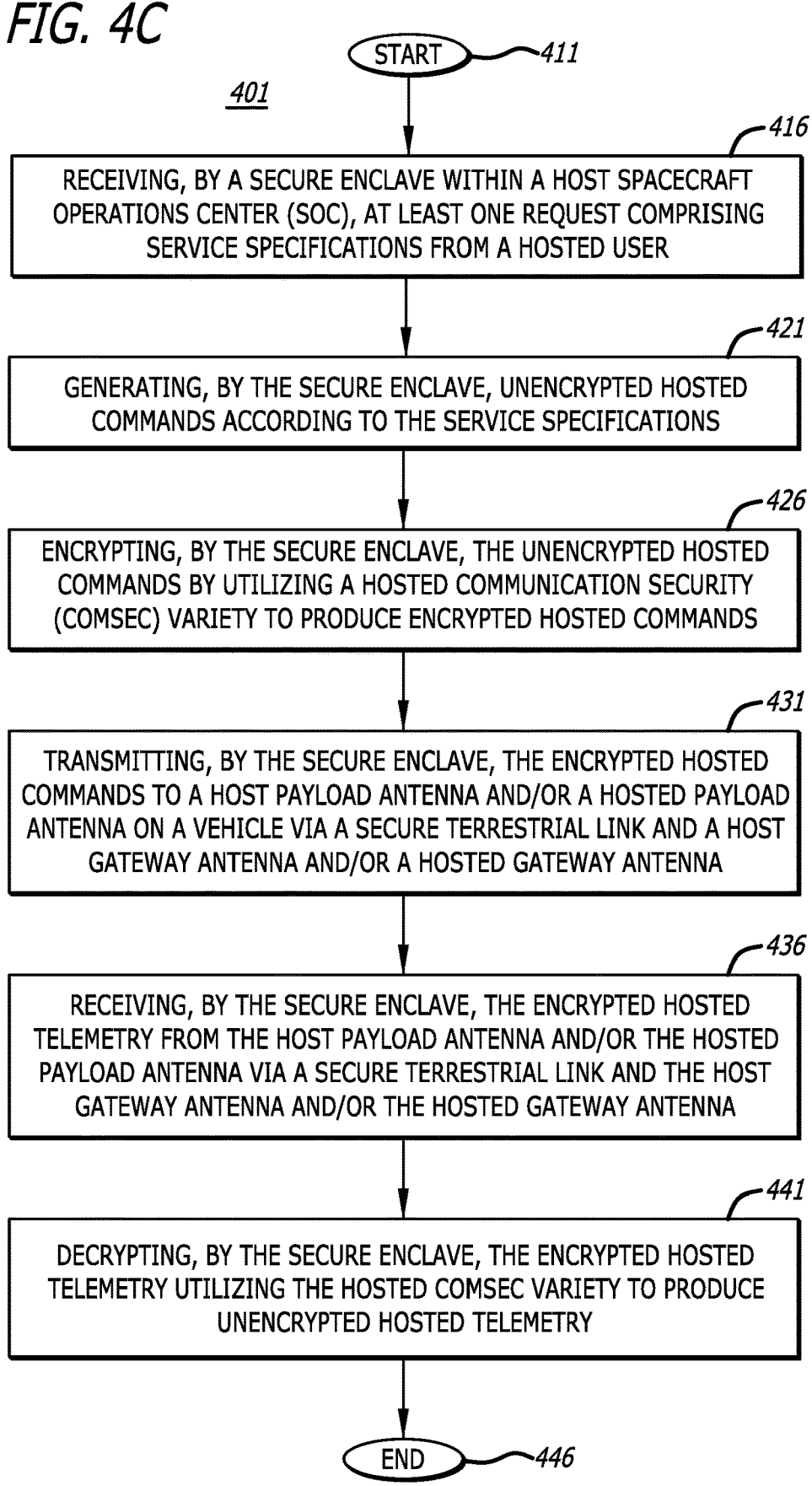

FIG. 4C is a flow chart for another disclosed method for satellite operations with a secure enclave for secure hosted payload operations for separate host and hosted payloads, where the host commands and telemetry are transmitted out-of-band, and the hosted commands and telemetry are transmitted inband, in accordance with at least one embodiment of the present disclosure.

FIGS. 5A and 5B together show a table listing a number of various different communications scenarios that may be employed by the disclosed system for satellite operations

DESCRIPTION

The methods and apparatus disclosed herein provide an operative system for satellite operations with a secure enclave for secure hosted payload operations. In particular, the disclosed system employs a host satellite operation center (SOC) that separates the data processing (e.g., the commanding and telemetry) of the host user (e.g., host operator) and the hosted user(s) (e.g., hosted payload operator(s)) by utilizing a secure enclave and a host SOC operation portion. The secure enclave portion is a secure portion of the host SOC that is utilized for the hosted user data processing, and allows for the hosted user(s) to maintain privacy of its data and operations from the host user. As such, the secure enclave provides full autonomous control of a portion of a shared payload (e.g., a host/hosted payload) or of at least one separate hosted payload installed on a satellite. The host SOC arrangement does not allow for the host user to have any knowledge of the commanding or telemetry of the portion of a shared payload (e.g., a host/hosted payload) used by the hosted user(s) or of at least one separate hosted payload installed on a satellite used by hosted user(s). The host SOC operating portion is utilized for the host user data processing, which remains private from the hosted user.

As previously mentioned above, currently, typical payload operations for a vehicle (e.g., a satellite) have the ability to perform switching of inputs to outputs of the payload on the vehicle. All of this switching on the payload is commanded and controlled by a single satellite controller with no resource allocation privacy. The disclosed system allows for private vehicle resource allocation and control that provides vehicle users the ability to privately, dynamically, allocate resources (e.g., a host/hosted payload, a host payload and/or a hosted payload) on demand.

The system of the present disclosure allows for vehicle operators to privately share vehicle resources by employing a secure enclave that is operated exclusively by the hosted payload operator(s), and by utilizing inband communications for the hosted commanding and/or hosted telemetry to and from the satellite. In one or more embodiments, the secure enclave and the host SOC are co-located. In some embodiments, the host SOC comprises the secure enclave (e.g., the secure enclave is located within the host SOC). For example, the secure enclave may comprise a secure compartmentalized area (e.g., a locked and/or guarded room or building) comprising secure isolated hardware (such as servers as well as encryptors and/or decryptors) located within (or proximate to) the host SOC (e.g., located within a building of the host SOC, or located on the campus of the host SOC). As such, the secure enclave may be a room located within a building of the host SOC facility, or may be a building located within the campus of the host SOC. In addition, for example, the secure enclave may be a portion of a room or building of the host SOC that is secure and compartmentalized by a physical partition(s), such as a fence or a wall within the room or building. The secure enclave operates separately and privately from the rest of the host SOC room, building, facility, or campus.

Access to the secure enclave is limited only to authorized persons. In one or more embodiments, the authorized persons are cleared to support the hosted payload(s) operations (including obtaining access to hosted telemetry and commands) of at least one hosted user. In one or more embodiments, the authorized persons are associated with (e.g., employed by) the hosted user(s). It should be noted that, in at least one embodiment, the authorized persons may be associated with (e.g., employed by) the host user, but supporting the hosted payload(s) operations for the hosted user(s).

Employing the secure enclave at the host SOC allows for separation and privacy of the hosted payload operator(s) activity and the host operator activity. The hosted payload operator(s) at the secure enclave communicates directly to and/or from the hosted payload(s) on the satellite via inband communications and, as such, the hosted payload operation data may be transmitted and/or received to the exclusion of the host operator and/or network.

As previously mentioned, the secure enclave, operated by a hosted payload operator(s), is located within the host SOC. Although the secure enclave itself is located within the host SOC, the secure enclave operates as a hosted payload (HoP) operation center (HOC), which is operated privately and securely by the hosted payload operator(s). The secure enclave is secure within the host SOC and separately operated by the hosted payload operator(s) such that the host activity in the host SOC and the hosted activity in the host SOC remain separate and private from one another within the host SOC. Thus, all processing of data and/or operations within the secure enclave maintains privacy for the hosted payload operator(s). The secure enclave provides full autonomous control by the hosted payload operator(s) over the hosted payload(s) installed on the satellite. In one or more embodiments, the hosted telemetry, command and control, and/or sensor data are communicated via inband directly to and from the hosted payload operator(s) within the secure enclave, to the exclusion of the host operator, where no commands, telemetry, and/or data pass though the host operator network to or from the satellite.

It should be noted that the host/hosted payload (i.e. shared payload), the host payload and/or at least one hosted payload for the disclosed system for private vehicle resource allocation and control may employ various different types of transponders. For example, various different types of transponders may be employed including, but not limited to, various different types of digital transponders, various different types of analog transponders (e.g., conventional repeater-type transponders), and various different types of combination analog/digital transponders.

In addition, it should be noted that in this disclosure, "inband" frequency band(s) refer to a frequency band(s) that is the same frequency band(s) utilized to transmit payload data (e.g., host payload data and/or hosted payload data); and "out-of-band" frequency band(s) refer to a frequency band(s) that is not the same frequency band(s) utilized to transmit payload data (e.g., host payload data). Additionally, it should be noted that in the disclosed system, all commanding and telemetry can be performed by any combination of inband frequency band(s) and out-of-band frequency bands(s). Refer to the table of FIGS. 5A and 5B, which shows the possible combinations for the transmission (i.e. transmitted either out-of-band or inband) of the host commanding, host telemetry, hosted commanding, and hosted telemetry for the disclosed system.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to satellite communication systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
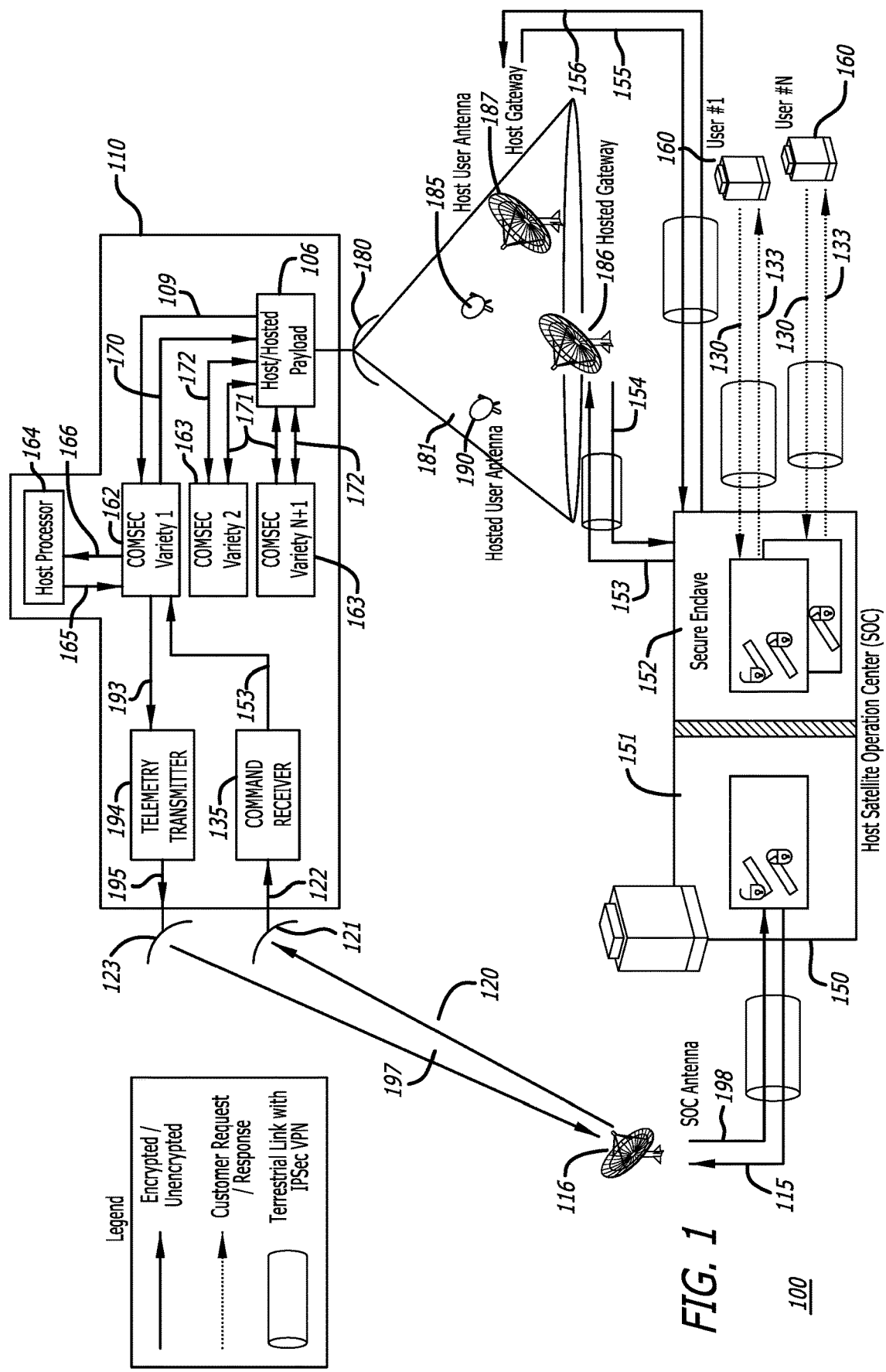

FIG. 1 is a diagram showing the disclosed system 100 for satellite operations with a secure enclave 152 with secure inband hosted payload operations for a combined host/hosted payload 106, where the host commands and telemetry are transmitted out-of-band, and the hosted commands and telemetry are transmitted inband, in accordance with at least one embodiment of the present disclosure. In this figure, a vehicle 110 and a host satellite operations center (SOC) 150 are shown. The host SOC 150 is shown to comprise satellite operation portion 151, which is operated by a host user, and a separate secure enclave 152 portion, which is operated by a hosted user. Various different types of vehicles may be employed for the vehicle 110 including, but not limited to, an airborne vehicle. And, various different types of airborne vehicles may be employed for the vehicle 110 including, but not limited to, a satellite, an aircraft, an unmanned aerial vehicle (UAV), and a space plane.

In the case of a satellite being employed for the vehicle 110, it should be noted that satellites typically include computer-controlled systems. A satellite generally includes a bus and a payload (e.g., a shared host/hosted payload 106). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. Different entities may use the different portions of the shared payload 106 on the satellite. For example, a host user (e.g., an owner of the satellite) may utilize one portion of the host/hosted payload 106, and the host user may lease out different portions of the host/hosted payload 106 to hosted users (e.g., customers) to use.

Leasing a portion of a payload(s) (e.g., a host/hosted payload 106) to a customer(s) (e.g., a hosted user(s)) may increase the revenues that an owner (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, the satellite operation portion 151 of the host SOC 150 generates unencrypted host commands according to service specifications for the host user. The host commands are commands that are used to configure the portion of the host/hosted payload 106 that is utilized by the host user. The various different types of service specifications that may be specified by the host user include, but are not limited to, regions of antenna coverage, effective isotropic radiation power (EIRP) for the antenna coverage, and a time period of when the antenna coverage is to occur. Then, the satellite operation portion 151 encrypts the unencrypted host commands by utilizing a host communication security (COMSEC) variety (e.g., COMSEC variety 1) to produce encrypted host commands. It should be noted that the host COMSEC variety may include at least one encryption key and/or at least one algorithm (e.g., a Type 1 encryption algorithm or a Type 2 encryption algorithm).

The satellite operation portion 151 of the host SOC 150 then transmits 115 (via a secure terrestrial link with internet protocol security (IPSec) virtual private network (VPN)) the encrypted host commands to a ground SOC antenna 116. Then, the SOC antenna 116 transmits 120 the encrypted host commands to a command antenna 121 on the vehicle 110. The SOC antenna 116 transmits 120 the encrypted host commands utilizing an out-of-band frequency band(s) (i.e. a frequency band(s) that is not the same frequency band(s) utilized to transmit payload data). The command antenna 121 on the vehicle 110 then transmits 122 the encrypted host commands to a command receiver 135.

The command receiver 135 then transmits 153 the encrypted host commands to a host communication security module 162. The host communication security module 162 decrypts the encrypted host commands utilizing the host COMSEC variety (e.g., COMSEC variety 1) to generate the unencrypted host commands.

It should be noted that the host communication security module 162 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 162 may comprise one or more processors.

Then, the host communication security module 162 transmits 166 the unencrypted host commands to a host (bus) processor 164. The host (bus) processor 164 reconfigures (e.g., by commanding) at least one bus component on the vehicle 110. Various different components on the bus of the vehicle 110 may be reconfigured by the host (bus) processor 164 including, but not limited to, batteries (e.g., including the charging and discharging of at least one of the batteries), heaters (e.g., including the turning "on" or "off" of at least one of the heaters to maintain a constant temperature on the vehicle 110), solar panels (e.g., including positioning at least one of the solar panels to increase efficiency of capturing sunlight), and propulsion systems (e.g., including commanding at least one of the propulsion units for positioning the vehicle 110 for station keeping the vehicle 110 within a specific orbital slot and/or location). After at least one bus component is reconfigured, the bus component(s) transmits bus telemetry to the host (bus) processor 164. The host (bus) processor 164 then generates unencrypted bus telemetry using the telemetry it received from the bus component(s), and transmits 165 the unencrypted bus telemetry to the host communication security module 162.

The host communication security module 162 also transmits 170 the unencrypted host commands to the host/hosted payload 106. The host/hosted payload 106 is reconfigured according to the unencrypted host commands. The reconfiguring of the host/hosted payload 106 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, effective isotropic radiation power (EIRP) for at least one beam, transponder channels, or beam steering. Additionally, the reconfiguring of the host/hosted payload 106 may comprise reconfiguring at least one of: the payload antenna 180, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host/hosted payload comprises 106 one or more processors.

After the host/hosted payload 106 is reconfigured, a payload antenna 180 then supports (e.g., in one or more antenna beams 181) host user data to a host user antenna 185 on the ground. It should be noted that in other embodiments, the host user antenna 185 may be airborne (e.g., located on an aircraft or satellite) or marine (e.g., located on a ship) rather than terrestrial (e.g., located on the ground) as is shown in FIG. 1.

Also, it should be noted that, although in FIG. 1, antenna beam 181 is shown to include a single circular spot beam; in other embodiments, the antenna beam 181 may include more than one beam as is shown in FIG. 1 (e.g., antenna beam 181 may include multiple beams, and antenna beam 181 may include beams of different shapes than the circular spot beam as is shown in FIG. 1 (e.g., antenna beam 181 may include elliptical beams and/or shaped beams of various different shapes).

It should be noted that in one or more embodiments, the payload antenna 180 may comprise one or more reflector dishes including, but not limited to, parabolic reflectors and/or shaped reflectors. In addition, the payload antenna 180 may comprise one or more multifeed antenna arrays.

The host/hosted payload 106 transmits 109 unencrypted host telemetry (i.e. telemetry data related to the portion of the host/hosted payload 106 that is utilized by the host user) to the host communication security module 162. The host communication security module 162 then encrypts the unencrypted host telemetry and the unencrypted bus telemetry utilizing the host COMSEC variety (i.e. COMESEC variety 1) to generate encrypted host telemetry.

The host communication security module 162 then transmits 193 the encrypted host telemetry to a telemetry transmitter 194. The telemetry transmitter 194 then transmits 195 the encrypted host telemetry to a telemetry antenna 123. The telemetry antenna 123 then transmits 197 the encrypted host telemetry to the SOC antenna 116. The SOC antenna 116 then transmits 198 (via a secure terrestrial link with IPSec VPN) the encrypted host telemetry to the satellite operation portion 151 of the host SOC 150. The satellite operation portion 151 then decrypts the encrypted host telemetry utilizing the host COMSEC variety (i.e. COMSEC variety 1) to generate the unencrypted host telemetry.

In addition, during operation, hosted users 160 (e.g., N number of hosted users 160) transmit 130 (via a secure terrestrial link with IPSec VPN) requests to a secure enclave 152 of the host SOC 150, where each of the requests comprises service specifications for the hosted user associated with the request. The various different types of service specifications that may be transmitted include, but are not limited to, regions of antenna coverage, EIRP for the antenna coverage, and a time period of when the antenna coverage is to occur. For example, hosted user #1 160 may transmit 130 a request(s) comprising service specifications for specific regions on the Earth to receive antenna coverage (e.g., by specifying latitude and longitude coordinates, geocentric coordinates, and/or geodetic coordinates for the coverage region(s)), the lowest level of EIRP to be received for those regions for the antenna coverage, and a time period of when the antenna overage is to occur.

After the secure enclave 152 receives the requests, the secure enclave 152 generates unencrypted hosted commands for each of the requests according to the service specifications of the associated request. The hosted commands are commands that are used to configure each of the portions of the host/hosted payload 106 that are utilized by the hosted users 160. Then, the secure enclave 152 encrypts the unencrypted hosted commands for each of the requests by utilizing a respective hosted communication security (COMSEC) variety for the hosted user associated with the request to produce encrypted hosted commands. As such, for each hosted user 160, a different hosted COMSEC variety will be utilized for the encryption of the hosted commands associated with that hosted user 160. It follows that for N number of hosted users 106, N number of hosted COMSEC varieties will be utilized to encrypt the hosted commands. However, it should be noted that for the encryption of the hosted user commands, COMSEC variety 2 to COMSEC variety N+1 will be utilized. For example, hosted commands associated with a request(s) from hosted user #1 160 will be encrypted with COMSEC variety 2, hosted commands associated with a request(s) from hosted user #2 160 will be encrypted with COMSEC variety 3, hosted commands associated with a request(s) from hosted user #3 160 will be encrypted with COMSEC variety 4, . . . and hosted commands associated with a request(s) from hosted user #N 160 will be encrypted with COMSEC variety N+1. It should be noted that the hosted COMSEC varieties may each include at least one encryption key and/or at least one algorithm (e.g., a Type 1 encryption algorithm or a Type 2 encryption algorithm).

Then, the secure enclave 152 transmits 153, 156 the encrypted hosted commands to a hosted gateway antenna 186 and/or a host gateway antenna 187. It should be noted that, in one or more embodiments, the secure enclave 152 transmits 153, 156 all of the encrypted hosted commands to either the hosted gateway antenna 186 or to the host gateway antenna 187. In at least one embodiment, the secure enclave 152 transmits 153, 156 all of the encrypted hosted commands (i.e. a full set of encrypted hosted commands) to each of the hosted gateway antenna 186 and the host gateway antenna 187, thereby providing a redundancy in the transmission of the encrypted hosted commands to the vehicle 110 in case there is a disruption in the transmission (e.g., a problem with the antenna hardware and/or a jamming of the signal) of one of the sets of the encrypted hosted commands. In some embodiments, the secure enclave 152 transmits 153, 156 only a portion of the encrypted hosted commands to the hosted gateway antenna 186 and a remaining portion of the host gateway antenna 187 such that both portions of the encrypted hosted commands together comprise one full set of encrypted hosted commands, thereby providing security for the encrypted hosted commands because if one portion of the encrypted hosted commands is intercepted in its transmission, the interceptor will not have the full set of encrypted hosted commands.

The hosted gateway antenna 186 and/or the host gateway antenna 187 then transmits the encrypted hosted commands to the payload antenna 180 on the vehicle 110. The hosted gateway antenna 186 and/or the host gateway antenna 187 transmits the encrypted hosted commands utilizing an inband frequency band(s) (i.e. a frequency band(s) that is the same frequency band(s) utilized to transmit payload data). The payload antenna 180 on the vehicle 110 then transmits the encrypted hosted commands to the host/hosted payload 106.

The host/hosted payload 106 on the vehicle 110 passes (transmits) 171 the encrypted hosted commands to hosted communication security modules 163. The hosted communication security modules 163 decrypt the encrypted hosted commands utilizing the hosted COMSEC varieties (e.g., COMSEC variety 2 to COMSEC variety N+1) to generate the unencrypted hosted commands.

It should be noted that the hosted communication security modules 163 may each comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security modules 163 may each comprise one or more processors.

the hosted communication security modules 163 then transmit 171 the unencrypted hosted commands to the host/hosted payload 106. The host/hosted payload 106 is reconfigured according to the unencrypted hosted commands. The reconfiguring of the host/hosted payload 106 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, EIRP for at least one beam, transponder channels, or beam steering. Additionally, the reconfiguring of the host/hosted payload 106 may comprise reconfiguring at least one of: the payload antenna 180, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

After the host/hosted payload 106 is reconfigured, the payload antenna 180 then supports (e.g., in one or more antenna beams 181) hosted user data to a hosted user antenna 190 on the ground. It should be noted that in other embodiments, the hosted user antenna 190 may be airborne (e.g., located on an aircraft or satellite) or marine (e.g., located on a ship) rather than terrestrial (e.g., located on the ground) as is shown in FIG. 1.

The host/hosted payload 106 then transmits 172 unencrypted hosted telemetry (i.e. telemetry data related to the portions of the host/hosted payload 106 that are utilized by the hosted users) to the hosted communication security modules 163. The hosted communication security modules 163 then encrypt the unencrypted hosted telemetry utilizing the hosted COMSEC varieties (i.e. COMSEC variety 2 to COMSEC variety N+1) to generate encrypted hosted telemetry. As such, for each hosted user 160, a different hosted COMSEC variety will be utilized for the encryption of the unencrypted hosted telemetry associated with that hosted user 160.

The hosted communication security modules 163 then transmit 172 the encrypted hosted telemetry to the host/hosted payload 106. The host/hosted payload 106 then transmits the encrypted hosted telemetry to the payload antenna 180. The payload antenna 180 transmits the encrypted hosted telemetry to the hosted gateway antenna 186 and/or the host gateway antenna 187. The payload antenna 180 transmits the encrypted hosted telemetry utilizing an inband frequency band(s) (i.e. a frequency band(s) that is the same frequency band(s) utilized to transmit payload data).

It should be noted that, on the vehicle 110, transmission lines 171 and 172 are depicted as double arrow lines to indicate the transmission of commands and telemetry, respectively. However, it should be noted that, although the transmission lines 171 and 172 are illustrated as one double arrow line, the transmission lines 171 and 172 in reality may comprise more than one separate and distinct secure transmission lines (e.g., separate wires) such that the encrypted and unencrypted signals are transmitted on their own separate secure lines (e.g., separate wires) from each other.

In addition, it should be noted that, in one or more embodiments, the payload antenna 180 transmits all of the encrypted hosted telemetry to either the hosted gateway antenna 186 or to the host gateway antenna 187. In at least one embodiment, the payload antenna 180 transmits all of the encrypted hosted telemetry (i.e. a full set of encrypted hosted telemetry) to each of the hosted gateway antenna 186 and the host gateway antenna 187, thereby providing a redundancy in the transmission of the encrypted hosted telemetry to the secure enclave 152 in case there is a disruption in the transmission (e.g., a problem with the antenna hardware and/or a jamming of the signal) of one of the sets of the encrypted hosted telemetry. In some embodiments, the payload antenna 180 transmits only a portion of the encrypted hosted telemetry to the hosted gateway antenna 186 and a remaining portion of the host gateway antenna 187 such that both portions of the encrypted hosted telemetry together comprise one full set of encrypted hosted telemetry, thereby providing security for the encrypted hosted telemetry because if one portion of the encrypted hosted telemetry is intercepted in its transmission, the interceptor will not have the full set of encrypted hosted telemetry.

The hosted gateway antenna 186 and/or the host gateway antenna 187 then transmits 154, 155 the encrypted hosted telemetry to the secure enclave 152 of the host SOC 150. The secure enclave 152 decrypts the encrypted hosted telemetry utilizing the hosted COMSEC varieties (e.g., COMSEC variety 2 to COMSEC variety N+1) to generate the unencrypted hosted telemetry. The secure enclave 152 then transmits 133 (via a secure terrestrial link with IPSec VPN) the unencrypted hosted telemetry respectively to the hosted users 160 that the unencrypted telemetry is associated.

It should be noted that, in one or more embodiments, the secure enclave 152 transmits 133 (via a secure terrestrial link with IPSec VPN) a confirmation to the hosted users 160 that their requests have been received and are being processed. In one or more embodiments, the secure enclave 152 subsequently transmits 133 (via a secure terrestrial link with IPSec VPN) a notification to the hosted users 160 that their requests have been satisfied (e.g., that the hosted payload portion of the host/hosted payload 106 has been reconfigured to satisfy the requests).

Figure 2A:
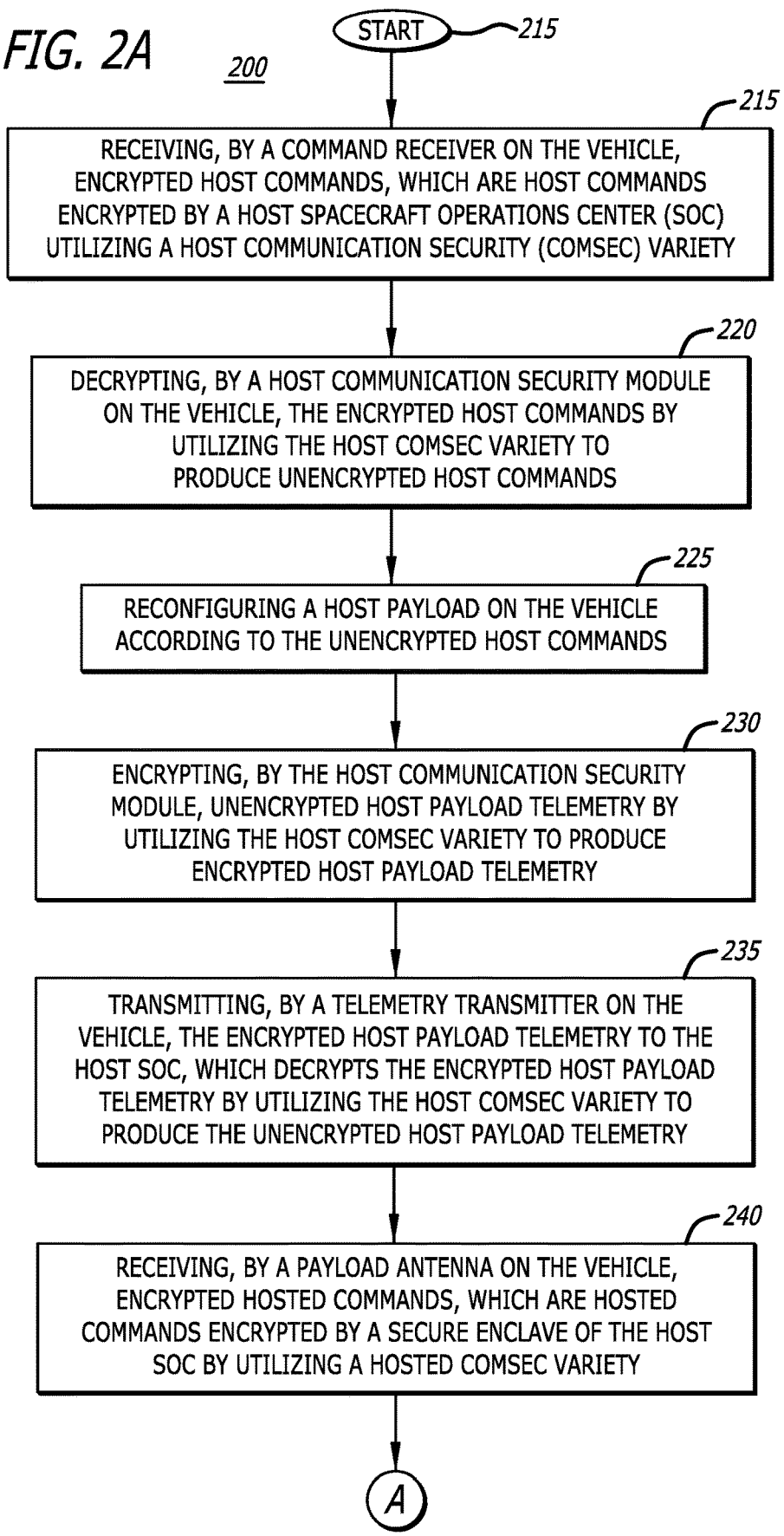
FIG. 2C is a flow chart for another disclosed method for satellite operations with a secure enclave for secure hosted payload operations for a combined host/hosted payload, where the host commands and telemetry are transmitted out-of-band, and the hosted commands and telemetry are transmitted inband, in accordance with at least one embodiment of the present disclosure.

FIGS. 2A and 2B together show a flow chart for the disclosed method 200 for satellite operations with a secure enclave for secure hosted payload operations for a combined host/hosted payload, where the host commands and telemetry are transmitted out-of-band, and the hosted commands and telemetry are transmitted inband, in accordance with at least one embodiment of the present disclosure. At the start 210 of the method 200, a command receiver, on a vehicle, receives encrypted host commands, which are host commands encrypted by a host SOC utilizing a host COMSEC variety 215. Then, a host communication security module, on the vehicle, decrypts the encrypted host commands by utilizing the host COMSEC variety to produce unencrypted host commands 220. A host payload on the vehicle is then reconfigured according to the unencrypted host commands 225. Then, the host communication security module encrypts unencrypted host payload telemetry by utilizing the host COMSEC variety to produce encrypted host payload telemetry 230. A telemetry transmitter, on the vehicle, then transmits the encrypted host payload telemetry to the host SOC, which decrypts the encrypted host payload telemetry by utilizing the host COMSEC variety to produce the unencrypted host payload telemetry 235.

A payload antenna, on the vehicle, receives (from a secure enclave of the host SOC via a host gateway antenna and/or a hosted gateway antenna) encrypted hosted commands, which are hosted commands encrypted by the secure enclave of the host SOC by utilizing a hosted COMSEC variety 240. Then, a hosted communication security module, on the vehicle, decrypts the encrypted hosted commands by utilizing the hosted COMSEC variety to produce unencrypted hosted commands 245. A hosted payload, on the vehicle, is then reconfigured according to the unencrypted hosted commands 250. Then, the hosted communication security module encrypts unencrypted hosted payload telemetry by utilizing the hosted COMSEC variety to produce encrypted hosted payload telemetry 255. Then, the payload antenna transmits host payload data and hosted payload data, and transmits (to the secure enclave of the host SOC via the host gateway antenna and/or the hosted gateway antenna) the encrypted hosted telemetry, which is decrypted by the secure enclave of the host SOC by utilizing the hosted COMSEC variety to produce the unencrypted hosted telemetry 260. Then, the method 200 ends 265.

Figure 2C:
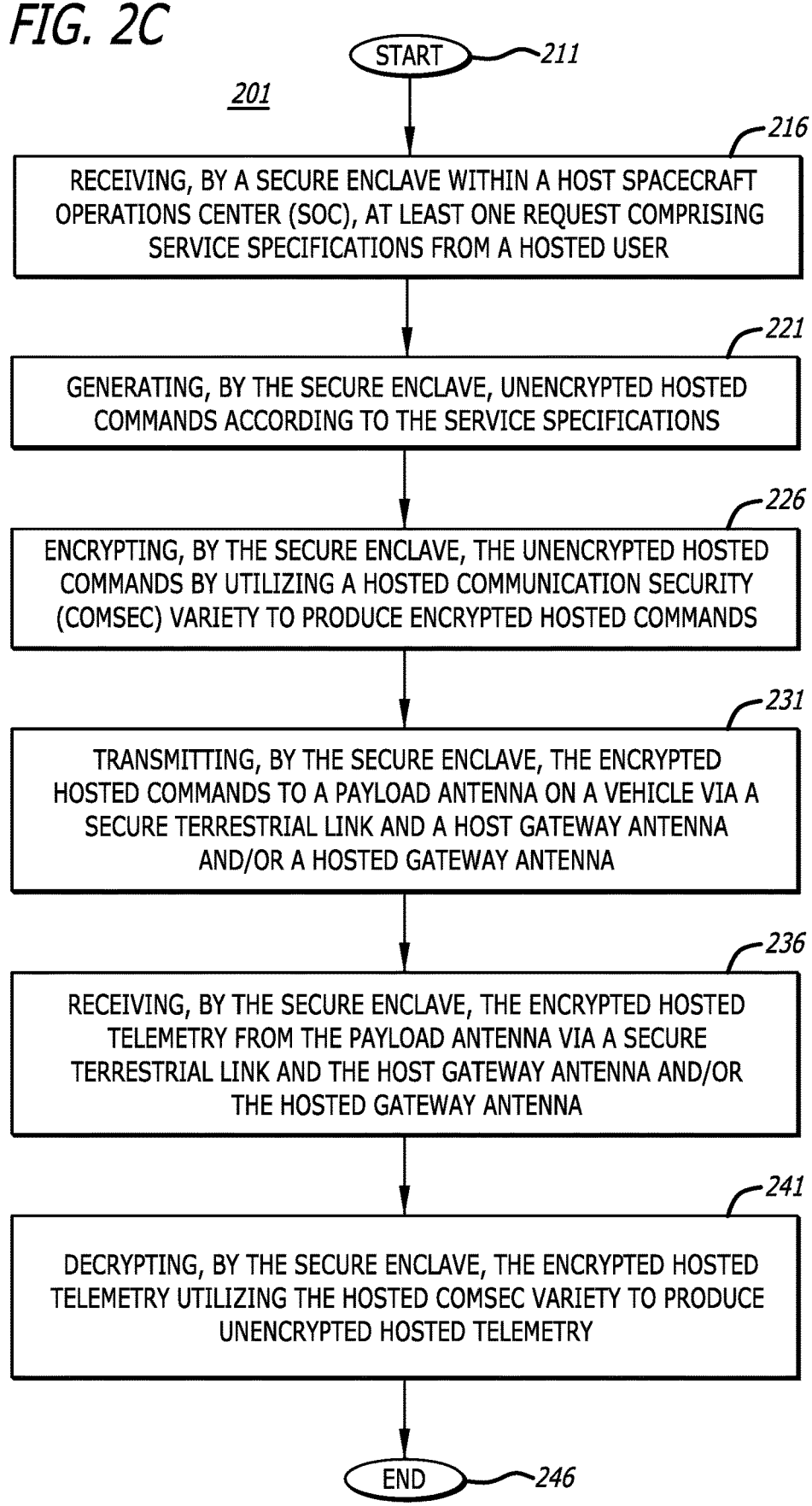

FIG. 2C is a flow chart for another disclosed method 201 for satellite operations with a secure enclave for secure hosted payload operations for a combined host/hosted payload, where the host commands and telemetry are transmitted out-of-band, and the hosted commands and telemetry are transmitted inband, in accordance with at least one embodiment of the present disclosure. At the start 211 of the method 201, a secure enclave within a host SOC receives at least one request comprising service specifications from a hosted user 216. Then, the secure enclave generates unencrypted hosted commands according to the service specifications 221. The secure enclave then encrypts the unencrypted hosted commands by utilizing a hosted COMSEC variety to produce encrypted hosted commands 226. Then, the secure enclave transmits the encrypted hosted commands to a payload antenna on a vehicle via a secure terrestrial link and a host gateway antenna and/or a hosted gateway antenna 231. In one or more embodiments, on the vehicle, the encrypted hosted commands are unencrypted utilizing the hosted COMSEC variety to produce the unencrypted hosted commands, a hosted portion of a host/hosted payload is reconfigured according to the unencrypted hosted commands, unencrypted hosted telemetry associated with the hosted portion of the host/hosted payload is encrypted utilizing the hosted COMSEC variety to produce encrypted hosted telemetry, and the encrypted hosted telemetry is transmitted by the payload antenna.

The secure enclave then receives the encrypted hosted telemetry from the payload antenna via a secure terrestrial link and the host gateway antenna and/or the hosted gateway antenna 236. Then, the secure enclave decrypts the encrypted hosted telemetry utilizing the hosted COMSEC variety to produce unencrypted hosted telemetry 241. Then, the method 201 ends 246.

Figure 3:
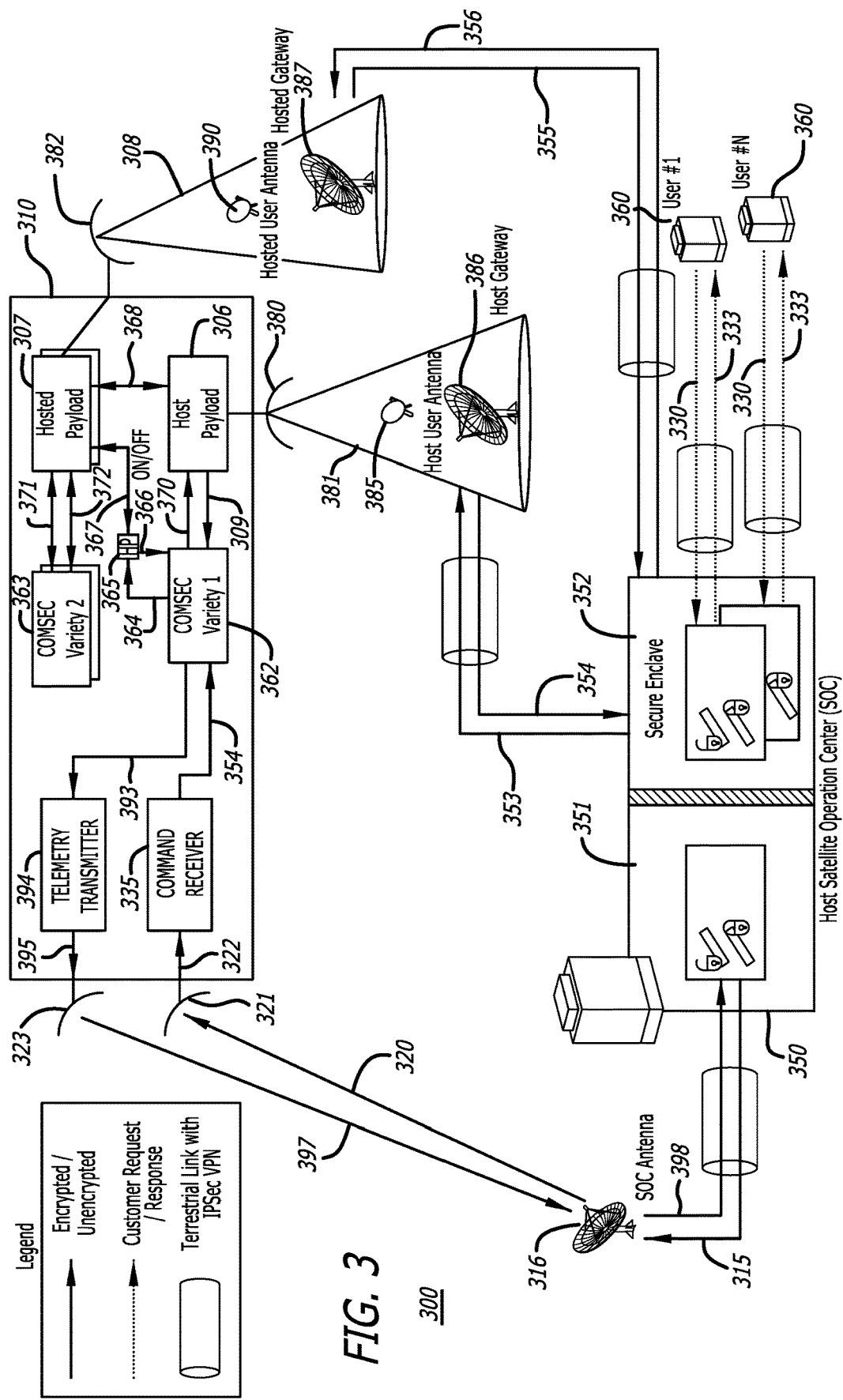
FIG. 3 is a diagram showing the disclosed system for satellite operations with a secure enclave for secure hosted payload operations for separate host and hosted payloads, where the host commands and telemetry are transmitted out-of-band, and the hosted commands and telemetry are transmitted inband, in accordance with at least one embodiment of the present disclosure.

FIG. 3 is a diagram showing the disclosed system 300 for satellite operations with a secure enclave 352 with secure inband hosted payload operations for separate host and hosted payloads 306, 307, where the host commands and telemetry are transmitted out-of-band, and the hosted commands and telemetry are transmitted inband, in accordance with at least one embodiment of the present disclosure. In this figure, a vehicle 310 and a host SOC 350 are shown. The host SOC 350 is shown to comprise a satellite operation portion 351, which is operated by a host user, and separate a secure enclave 352 portion, which is operated by a hosted user. Various different types of vehicles may be employed for the vehicle 310 including, but not limited to, an airborne vehicle. And, various different types of airborne vehicles may be employed for the vehicle 310 including, but not limited to, a satellite, an aircraft, a UAV, and a space plane.

In the case of a satellite being employed for the vehicle 310, it should be noted that satellites typically include computer-controlled systems. A satellite generally includes a bus and a payload(s) (e.g., a host payload 306 and/or a hosted payload(s) 307). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. Different entities may use the different payloads (i.e. the host payload 306 and the hosted payload(s) 307) on the satellite. For example, a host user (e.g., an owner of the satellite) may utilize the host payload 306, and the host user may lease out at least one hosted payload(s) 307 to hosted users (e.g., customers) to use.

Leasing a payload(s) (e.g., a hosted payload(s) 307) to a customer(s) (e.g., a hosted user(s)) may increase the revenues that an owner (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, the satellite operation portion 351 of the host SOC 350 generates unencrypted host commands according to service specifications for the host user. The host commands are commands that are used to configure the host payload 306 that is utilized by the host user. The various different types of service specifications that may be specified by the host user include, but are not limited to, regions of antenna coverage, EIRP for the antenna coverage, and a time period of when the antenna coverage is to occur. Then, the satellite operation portion 351 encrypts the unencrypted host commands by utilizing a host COMSEC variety (e.g., COMSEC variety 1) to produce encrypted host commands. It should be noted that the host COMSEC variety may include at least one encryption key and/or at least one algorithm (e.g., a Type 1 encryption algorithm or a Type 2 encryption algorithm).

The satellite operation portion 351 of the host SOC 350 then transmits 315 (via a secure terrestrial link with IPSec VPN) the encrypted host commands to a ground SOC antenna 316. Then, the SOC antenna 316 transmits 320 the encrypted host commands to a command antenna 321 on the vehicle 310. The SOC antenna 316 transmits 320 the encrypted host commands utilizing an out-of-band frequency band(s) (i.e. a frequency band(s) that is not the same frequency band(s) utilized to transmit payload data). The command antenna 321 on the vehicle 310 then transmits 322 the encrypted host commands to a command receiver 335. The command receiver 335 transmits 354 the encrypted host commands to host communication security module 362. The host communication security module 362 decrypts the encrypted host commands utilizing the host COMSEC variety (e.g., COMSEC variety 1) to generate the unencrypted host commands.

It should be noted that the host communication security module 362 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 362 may comprise one or more processors.

Then, the host communication security module 362 transmits 364 the unencrypted host commands to a host (bus) processor (HP) 365. The host (bus) processor 365 reconfigures (e.g., by commanding) at least one bus component on the vehicle 310. Various different components on the vehicle 310 may be reconfigured by the host (bus) processor 365 including, but not limited to, the hosted payload(s) 307 (e.g., including turning "on" or "off" at least one of the hosted payload(s) 307), batteries (e.g., including the charging and discharging of at least one of the batteries), heaters (e.g., including the turning "on" or "off" of at least one of the heaters to maintain a constant temperature on the vehicle 310), solar panels (e.g., including positioning at least one of the solar panels to increase efficiency of capturing sunlight), and propulsion systems (e.g., including commanding at least one of the propulsion units for positioning the vehicle 310 for station keeping the vehicle 310 within a specific orbital slot and/or location).

Then, the host (bus) processor (HP) 365 transmits 367 an on/off command to at least one hosted payload 307 to command the host payload(s) 307 to turn "on" or "off". After at least one bus component (e.g., the host payload(s) 307) is reconfigured (e.g., turned "on" or "off"), the bus component(s) (e.g., the host payload(s) 307) transmits 367 bus telemetry to the host (bus) processor 365. The host (bus) processor 365 then generates unencrypted bus telemetry using the telemetry it received from the bus component(s), and transmits 366 the unencrypted bus telemetry to the host communication security module 362.

The host communication security module 362 also transmits 370 the unencrypted host commands to the host payload 306. The host payload 306 is reconfigured according to the unencrypted host commands. The reconfiguring of the host payload 306 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, EIRP for at least one beam, transponder channels, or beam steering. Additionally, the reconfiguring of the host payload 306 may comprise reconfiguring at least one of: a host payload antenna 380 (e.g., by steering the antenna), at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host payload 306 and/or the hosted payload(s) 307 comprise one or more processors.

After the host payload 306 is reconfigured, a host payload antenna 380 then supports (e.g., in one or more antenna beams 381) host user data to a host user antenna 385 on the ground. It should be noted that in other embodiments, the host user antenna 385 may be airborne (e.g., located on an aircraft or satellite) or marine (e.g., located on a ship) rather than terrestrial (e.g., located on the ground) as is shown in FIG. 3.

Also, it should be noted that, although in FIG. 3, antenna beam 381 is shown to include a single circular spot beam; in other embodiments, the antenna beam 381 may include more than one beam as is shown in FIG. 3 (e.g., antenna beam 381 may include multiple beams, and antenna beam 381 may include beams of different shapes than the circular spot beam as is shown in FIG. 3 (e.g., antenna beam 381 may include elliptical beams and/or shaped beams of various different shapes).

It should be noted that in one or more embodiments, the host payload antenna 380 may comprise one or more reflector dishes including, but not limited to, parabolic reflectors and/or shaped reflectors. In addition, the host payload antenna 380 may comprise one or more multifeed antenna arrays.

After the host payload 306 is reconfigured, the host payload 306 transmits 309 unencrypted host telemetry (i.e. telemetry data related to the host payload 306 that is utilized by the host user) to the host communication security module 362. The host communication security module 362 then encrypts the unencrypted host telemetry and the unencrypted bus telemetry utilizing the host COMSEC variety (i.e. COMESEC variety 1) to generate encrypted host telemetry.

The host communication security module 362 then transmits 393 the encrypted host telemetry to a telemetry transmitter 394. The telemetry transmitter 394 then transmits 395 the encrypted host telemetry to a telemetry antenna 323. The telemetry antenna 323 then transmits 397 the encrypted host telemetry to the SOC antenna 316. The SOC antenna 316 then transmits 398 (via a secure terrestrial link with IPSec VPN) the encrypted host telemetry to the satellite operation portion 351 of the host SOC 350. The satellite operation portion 351 then decrypts the encrypted host telemetry utilizing the host COMSEC variety (i.e. COMSEC variety 1) to generate the unencrypted host telemetry.

Also, during operation, hosted users 360 (e.g., N number of hosted users 360) transmit 330 (via a secure terrestrial link with IPSec VPN) requests to a secure enclave 352 of a host satellite operation center (SOC) 350, where each of the requests comprises service specifications for the hosted user associated with the request. The various different types of service specifications that may be transmitted include, but are not limited to, regions of antenna coverage, EIRP for the antenna coverage, and a time period of when the antenna coverage is to occur. For example, hosted user #1 360 may transmit 330 a request(s) comprising service specifications for specific regions on the Earth to receive antenna coverage (e.g., by specifying latitude and longitude coordinates, geocentric coordinates, and/or geodetic coordinates for the coverage region(s)), the lowest level of EIRP to be received for those regions for the antenna coverage, and a time period of when the antenna overage is to occur.

After the secure enclave 352 receives the requests, the secure enclave 352 generates unencrypted hosted commands for each of the requests according to the service specifications of the associated request. The hosted commands are commands that are used to configure the hosted payload(s) 307 that are utilized by the hosted users 360. Then, the secure enclave 352 encrypts the unencrypted hosted commands for each of the requests by utilizing a respective hosted communication security (COMSEC) variety for the hosted user associated with the request to produce encrypted hosted commands. As such, for each hosted user 360, a different hosted COMSEC variety will be utilized for the encryption of the hosted commands associated with that hosted user 360. It follows that for N number of hosted users 360, N number of hosted COMSEC varieties will be utilized to encrypt the hosted commands. However, it should be noted that for the encryption of the hosted user commands, COMSEC variety 2 to COMSEC variety N+1 will be utilized. For example, hosted commands associated with a request(s) from hosted user #1 360 will be encrypted with COMSEC variety 2, hosted commands associated with a request(s) from hosted user #2 360 will be encrypted with COMSEC variety 3, hosted commands associated with a request(s) from hosted user #3 360 will be encrypted with COMSEC variety 4, . . . and hosted commands associated with a request(s) from hosted user #N 360 will be encrypted with COMSEC variety N+1. It should be noted that the hosted COMSEC varieties may each include at least one encryption key and/or at least one algorithm (e.g., a Type 1 encryption algorithm or a Type 2 encryption algorithm).

Then, the secure enclave 352 transmits 353, 356 the encrypted hosted commands to a host gateway antenna 386 and/or a hosted gateway antenna 387. It should be noted that, in one or more embodiments, the secure enclave 352 transmits 353, 356 all of the encrypted hosted commands to either the hosted gateway antenna 387 or to the host gateway antenna 386. In at least one embodiment, the secure enclave 352 transmits 353, 356 all of the encrypted hosted commands (i.e. a full set of encrypted hosted commands) to each of the hosted gateway antenna 387 and the host gateway antenna 386, thereby providing a redundancy in the transmission of the encrypted hosted commands to the vehicle 310 in case there is a disruption in the transmission (e.g., a problem with the antenna hardware and/or a jamming of the signal) of one of the sets of the encrypted hosted commands. In some embodiments, the secure enclave 352 transmits 353, 356 only a portion of the encrypted hosted commands to the hosted gateway antenna 387 and a remaining portion of the host gateway antenna 386 such that both portions of the encrypted hosted commands together comprise one full set of encrypted hosted commands, thereby providing security for the encrypted hosted commands because if one portion of the encrypted hosted commands is intercepted in its transmission, the interceptor will not have the full set of encrypted hosted commands.

The host gateway antenna 386 and/or the hosted gateway antenna 387 then transmits the encrypted hosted commands to the host payload antenna 380 and/or the hosted payload antenna 382, respectively. the host payload antenna 380 and/or the hosted payload antenna 382 transmits the encrypted hosted commands utilizing an inband frequency band(s) (i.e. a frequency band(s) that is the same frequency band(s) utilized by the host payload antenna 380 and/or the hosted payload antenna 382).

The host payload antenna 380 on the vehicle then transmits the encrypted hosted commands to the host payload 306. The host payload 306 then transmits (passes) 368 the encrypted hosted commands to the hosted payload(s) 307.

The hosted payload antenna 382 on the vehicle 310 then transmits the encrypted hosted commands to the hosted payload(s) 307. Then, the hosted payload(s) 307 transmits 371 the encrypted hosted commands to hosted communication security modules 363. The hosted communication security modules 363 decrypt the encrypted hosted commands utilizing the hosted COMSEC varieties (e.g., COMSEC variety 2 to COMSEC variety N+1) to generate the unencrypted hosted commands.

It should be noted that the hosted communication security modules 363 may each comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security modules 363 may each comprise one or more processors.

Then, the hosted communication security modules 363 transmit 371 the unencrypted hosted commands to the hosted payload(s) 307. The hosted payload(s) 307 is then reconfigured according to the unencrypted hosted commands. The reconfiguring of the hosted payload(s) 307 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, EIRP for at least one beam, transponder channels, or beam steering. Additionally, the reconfiguring of the hosted payload(s) 307 may comprise reconfiguring at least one of: the hosted payload antenna 382 (e.g., by steering the antenna), at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

After the host payload(s) 307 is reconfigured, the hosted payload antenna 382 then supports (e.g., in one or more antenna beams 308) hosted user data to a hosted user antenna 390 on the ground. It should be noted that in other embodiments, the hosted user antenna 390 may be airborne (e.g., located on an aircraft or satellite) or marine (e.g., located on a ship) rather than terrestrial (e.g., located on the ground) as is shown in FIG. 3.

Also, it should be noted that, although in FIG. 3, antenna beam 308 is shown to include a single circular spot beam; in other embodiments, the antenna beam 308 may include more than one beam as is shown in FIG. 3 (e.g., antenna beam 308 may include multiple beams, and antenna beam 308 may include beams of different shapes than the circular spot beam as is shown in FIG. 3 (e.g., antenna beam 308 may include elliptical beams and/or shaped beams of various different shapes).

It should be noted that in one or more embodiments, the hosted payload antenna 382 may comprise one or more reflector dishes including, but not limited to, parabolic reflectors and/or shaped reflectors. In addition, the hosted payload antenna 382 may comprise one or more multifeed antenna arrays.

After the hosted payload(s) 307 is reconfigured, the hosted payload(s) 307 transmits 372 unencrypted hosted telemetry (i.e. telemetry data related to the hosted payload(s) 307 that is utilized by the hosted user(s)) to the hosted communication security modules 363. The hosted communication security modules 363 then encrypt the unencrypted hosted telemetry utilizing the hosted COMSEC varieties (i.e. COMSEC variety 2 to COMSEC variety N+1) to generate encrypted hosted telemetry. As such, for each hosted user 360, a different hosted COMSEC variety will be utilized for the encryption of the unencrypted hosted telemetry associated with that hosted user 360.

The hosted communication security module 363 then transmits 372 the encrypted hosted telemetry to the hosted payload(s) 307. The hosted payload(s) 307 then transmits the encrypted hosted telemetry to the hosted payload antenna 382 and/or transmits 368 the encrypted hosted telemetry to the host payload 306, which subsequently transmits the encrypted hosted telemetry to the host payload antenna 380. The host payload antenna 380 and/or the hosted payload antenna 382 then transmit the encrypted hosted telemetry to the host gateway antenna 386 and/or the hosted gateway antenna 387, respectively.

It should be noted that, on the vehicle 310, transmission lines 371 and 372 are depicted as double arrow lines to indicate the transmission of commands and telemetry, respectively. However, it should be noted that, although the transmission lines 371 and 372 are illustrated as one double arrow line, the transmission lines 371 and 372 in reality may comprise more than one separate and distinct secure transmission lines (e.g., separate wires) such that the encrypted and unencrypted signals are transmitted on their own separate secure lines (e.g., separate wires) from each other.

In addition, it should be noted that, in one or more embodiments, the host payload antenna 380 and/or the hosted payload antenna 382 respectively transmit all of the encrypted hosted telemetry to either the hosted gateway antenna 386 or to the host gateway antenna 387. In at least one embodiment, the host payload antenna 380 and/or the hosted payload antenna 382 respectively transmit all of the encrypted hosted telemetry (i.e. a full set of encrypted hosted telemetry) to each of the hosted gateway antenna 386 and the host gateway antenna 387, thereby providing a redundancy in the transmission of the encrypted hosted telemetry to the secure enclave 352 in case there is a disruption in the transmission (e.g., a problem with the antenna hardware and/or a jamming of the signal) of one of the sets of the encrypted hosted telemetry. In some embodiments, the host payload antenna 380 and/or the hosted payload antenna 382 respectively transmit only a portion of the encrypted hosted telemetry to the hosted gateway antenna 386 and a remaining portion of the host gateway antenna 387 such that both portions of the encrypted hosted telemetry together comprise one full set of encrypted hosted telemetry, thereby providing security for the encrypted hosted telemetry because if one portion of the encrypted hosted telemetry is intercepted in its transmission, the interceptor will not have the full set of encrypted hosted telemetry.

The host payload antenna 380 and/or the hosted payload antenna 382 transmit the encrypted hosted telemetry utilizing an inband frequency band(s) (i.e. a frequency band(s) that is the same frequency band(s) utilized by the host payload antenna 380 and/or the hosted payload antenna 382). The host gateway antenna 386 and/or the hosted gateway antenna 387 then transmit 354, 355 the encrypted hosted telemetry to the secure enclave 352.

The secure enclave 352 decrypts the encrypted hosted telemetry utilizing the hosted COMSEC varieties (e.g., COMSEC variety 2 to COMSEC variety N+1) to generate the unencrypted hosted telemetry. The secure enclave 352 then transmits 333 (via a secure terrestrial link with IPSec VPN) the unencrypted hosted telemetry respectively to the hosted users 360 that the unencrypted telemetry is associated.

It should be noted that, in one or more embodiments, the secure enclave 352 transmits 333 (via a secure terrestrial link with IPSec VPN) a confirmation to the hosted users 360 that their requests have been received and are being processed. In one or more embodiments, the secure enclave 352 subsequently transmits 333 (via a secure terrestrial link with IPSec VPN) a notification to the hosted users 360 that their requests have been satisfied (e.g., that the hosted payload 307 has been reconfigured to satisfy the requests).

FIGS. 4A and 4B together show a flow chart for the disclosed method 400 for satellite operations with a secure enclave for secure hosted payload operations for separate host and hosted payloads, where the host commands and telemetry are transmitted out-of-band, and the hosted commands and telemetry are transmitted inband, in accordance with at least one embodiment of the present disclosure. At the start 410 of the method 400, a command receiver, on the vehicle, receives encrypted host commands, which are host commands encrypted by a host SOC utilizing a host COMSEC variety 415. Then, a host communication security module, on the vehicle, encrypts the encrypted host commands by utilizing the host COMSEC variety to produce unencrypted host commands 420. A host processor then commands a hosted payload on the vehicle "on" or "off" according to the unencrypted host commands 425. Then, a host payload, on the vehicle, is reconfigured according to the unencrypted host commands 430. The host communication security module then encrypts unencrypted host payload telemetry by utilizing the host COMSEC variety to produce encrypted host payload telemetry 435. Then, a telemetry transmitter, on the vehicle, transmits the encrypted host payload telemetry to the host SOC, which decrypts the encrypted host payload telemetry by utilizing the host COMSEC variety to produce the unencrypted host payload telemetry 440.

A host payload antenna and/or a hosted payload antenna, on the vehicle, receives (from a secure enclave of the host SOC via a host gateway antenna and/or a hosted gateway antenna) encrypted hosted commands, which are hosted commands encrypted by a secure enclave of the host SOC by utilizing a hosted COMSEC variety 445. Then, a hosted communication security module, on the vehicle, decrypts the encrypted hosted commands by utilizing the hosted COMSEC variety to produce unencrypted hosted commands 450. The hosted payload, on the vehicle, is then reconfigured according to the unencrypted hosted commands 455. Then, the hosted communication security module encrypts unencrypted hosted payload telemetry by utilizing the hosted COMSEC variety to produce encrypted hosted payload telemetry 460. The host payload antenna and/or the hosted payload antenna then transmits (to the secure enclave of the host SOC via a host gateway antenna and/or a hosted gateway antenna) the encrypted hosted telemetry, which is decrypted by the secure enclave of the host SOC by utilizing the hosted COMSEC variety to produce the unencrypted hosted telemetry 465. Then, the method 400 ends 470.

FIG. 4C is a flow chart for another disclosed method 401 for satellite operations with a secure enclave for secure hosted payload operations for separate host and hosted payloads, where the host commands and telemetry are transmitted out-of-band, and the hosted commands and telemetry are transmitted inband, in accordance with at least one embodiment of the present disclosure. At the start 411 of the method 401, a secure enclave within a host SOC receives at least one request comprising service specifications from a hosted user 416. Then, the secure enclave generates unencrypted hosted commands according to the service specifications 421. The secure enclave then encrypts the unencrypted hosted commands by utilizing a hosted COMSEC variety to produce encrypted hosted commands 426. Then, the secure enclave transmits the encrypted hosted commands to a host payload antenna and/or a hosted payload antenna on a vehicle via a secure terrestrial link and a host gateway antenna and/or a hosted gateway antenna 431. In one or more embodiments, on the vehicle, the encrypted hosted commands are unencrypted utilizing the hosted COMSEC variety to produce the unencrypted hosted commands, a hosted payload is reconfigured according to the unencrypted hosted commands, unencrypted hosted telemetry associated with the hosted payload is encrypted utilizing the hosted COMSEC variety to produce encrypted hosted telemetry, and the encrypted hosted telemetry is transmitted by at least one of the host payload antenna or the hosted payload antenna.

The secure enclave then receives the encrypted hosted telemetry from the host payload antenna and/or the hosted payload antenna via a secure terrestrial link and the host gateway antenna and/or the hosted gateway antenna 436. Then, the secure enclave decrypts the encrypted hosted telemetry utilizing the hosted COMSEC variety to produce unencrypted hosted telemetry 441. Then, the method 401 ends 446.

FIGS. 5A and 5B together show a table listing a number of various different communications scenarios that may be employed by the disclosed system for satellite operations with a secure enclave for secure hosted payload operations, in accordance with at least one embodiment of the present disclosure. In particular, the table identifies a total of forty-eight (48) different communication scenarios (or combinations) that may be employed by the disclosed system. The columns of the table show the type of communications (e.g., out-of-band or inband communications) used for the transmitting and receiving of the host commands (CMD), host telemetry (TLM), hosted commands from the secure enclave, and hosted telemetry to the secure enclave for the disclosed system. For example, the systems 100, 300 illustrated in FIGS. 1 and 3, respectively, both utilize the communications specified in scenarios 1, 2, 3, and 4 of the table. It should be noted that, in one or more embodiments, the disclosed system for satellite operations with a secure enclave for secure hosted payload operations may be modified as needed to accommodate any of the communications scenarios shown in this table.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A vehicle configured to carry a host payload and a hosted payload, the vehicle comprising:
   a command receiver configured to receive encrypted host commands, which are host commands encrypted by a host spacecraft operations center (SOC) utilizing a host communication security (COMSEC) variety;
   a host communication security module configured to decrypt the encrypted host commands by utilizing the host COMSEC variety to produce unencrypted host commands;
   wherein the unencrypted host commands are configured to reconfigure the host payload on the vehicle according to the unencrypted host commands;
   wherein the host communication security module is configured to encrypt unencrypted host payload telemetry by utilizing the host COMSEC variety to produce encrypted host payload telemetry;
   a telemetry transmitter configured to transmit the encrypted host payload telemetry to the host SOC, which decrypts the encrypted host payload telemetry by utilizing the host COMSEC variety to produce the unencrypted host payload telemetry;

a payload antenna configured to receive encrypted hosted commands, which are hosted commands encrypted by a secure enclave of the host SOC by utilizing a hosted COMSEC variety;

a hosted communication security module configured to decrypt the encrypted hosted commands by utilizing the hosted COMSEC variety to produce unencrypted hosted commands;

wherein the unencrypted hosted commands are configured to reconfigure a hosted payload on the vehicle according to the unencrypted hosted commands;

wherein the hosted communication security module is configured to encrypt unencrypted hosted payload telemetry by utilizing the hosted COMSEC variety to produce encrypted hosted payload telemetry; and wherein the payload antenna is configured to transmit host payload data, hosted payload data, and the encrypted hosted telemetry, which is decrypted by the secure enclave of the host SOC by utilizing the hosted COMSEC variety to produce the unencrypted hosted telemetry.

2. The vehicle of claim 1, wherein the vehicle is configured to carry a combined host/hosted payload comprising the host payload and the hosted payload.

3. The vehicle of claim 1, wherein the payload antenna receives the encrypted hosted commands from the secure enclave of the host SOC via a secure terrestrial link and at least one of a host gateway antenna or a hosted gateway antenna.

4. The vehicle of claim 3, wherein the payload antenna receives a full set of the encrypted hosted commands from one of the host gateway antenna or the hosted gateway antenna.

5. The vehicle of claim 3, wherein the payload antenna receives a full set of the encrypted hosted commands from each of the host gateway antenna and the hosted gateway antenna.

6. The vehicle of claim 3, wherein the payload antenna receives a portion of a full set of the encrypted hosted commands from the host gateway antenna, and receives a remaining portion of the full set of the encrypted hosted commands from the hosted gateway antenna.

7. The vehicle of claim 1, wherein the payload antenna transmits the encrypted hosted telemetry to the secure enclave of the host SOC via a secure terrestrial link and at least one of a host gateway antenna or a hosted gateway antenna.

8. The vehicle of claim 1, wherein the reconfiguring of at least one of the host payload or the hosted payload comprises adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

9. The vehicle of claim 1, wherein the reconfiguring of the host payload comprises reconfiguring at least one of: at least a portion of the payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

10. The vehicle of claim 1, wherein the reconfiguring of the hosted payload comprises reconfiguring at least one of: at least a portion of the payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

11. A vehicle configured to carry a host payload and a hosted payload, the vehicle comprising:

a command receiver configured to receive encrypted host commands, which are host commands encrypted by a host spacecraft operations center (SOC) utilizing a host communication security (COMSEC) variety;

a host communication security module configured to decrypt the encrypted host commands by utilizing the host COMSEC variety to produce unencrypted host commands;

a host processor configured to command the hosted payload on the vehicle at least one of on or off according to the unencrypted host commands;

wherein the host commands are configured to reconfigure the host payload on the vehicle according to the unencrypted host commands;

wherein the host communication security module is configured to encrypt unencrypted host payload telemetry by utilizing the host COMSEC variety to produce encrypted host payload telemetry;

a telemetry transmitter configured to transmit the encrypted host payload telemetry to the host SOC, which decrypts the encrypted host payload telemetry by utilizing the host COMSEC variety to produce the unencrypted host payload telemetry;

a host payload antenna and a hosted payload antenna which are configured to receive, by at least one of the host payload antenna or the hosted payload antenna, encrypted hosted commands, which are hosted commands encrypted by a secure enclave of the host SOC by utilizing a hosted COMSEC variety;

a hosted communication security module configured to decrypt the encrypted hosted commands by utilizing the hosted COMSEC variety to produce unencrypted hosted commands;

wherein the unencrypted hosted commands are configured to reconfigure the hosted payload on the vehicle according to the unencrypted hosted commands;

wherein the hosted communication security module is configured to encrypt unencrypted hosted payload telemetry by utilizing the hosted COMSEC variety to produce encrypted hosted payload telemetry; and wherein the host payload antenna and the hosted payload antenna are configured to transmit, by at least one of the host payload antenna or the hosted payload antenna, the encrypted hosted telemetry, which is decrypted by the secure enclave of the host SOC by utilizing the hosted COMSEC variety to produce the unencrypted hosted telemetry.

12. The vehicle of claim 11, wherein:
the host payload antenna is configured to transmit host payload data; and
the hosted payload antenna is configured to transmit hosted payload data.

13. The vehicle of claim 11, wherein the at least one of the host payload antenna or the hosted payload antenna receives the encrypted hosted commands from the secure enclave of the host SOC via a secure terrestrial link and at least one of a host gateway antenna or a hosted gateway antenna.

14. The vehicle of claim 11, wherein the at least one of the host payload antenna or the hosted payload antenna transmits the encrypted hosted telemetry to the secure enclave of the host SOC via a secure terrestrial link and at least one of a host gateway antenna or a hosted gateway antenna.

15. The vehicle of claim 11, wherein the reconfiguring of at least one of the host payload or the hosted payload comprises adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

16. The vehicle of claim 11, wherein the reconfiguring of the host payload comprises reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

17. The vehicle of claim 11, wherein the reconfiguring of the hosted payload comprises reconfiguring at least one of: the hosted payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

18. A secure enclave configured to operate within a host spacecraft operations center (SOC), the secure enclave being configured to:
receive at least one request comprising service specifications from a hosted user;
generate unencrypted hosted commands according to the service specifications;
encrypt the unencrypted hosted commands by utilizing a hosted communication security (COMSEC) variety to produce encrypted hosted commands;
transmit the encrypted hosted commands to a payload antenna on a vehicle via a secure terrestrial link and at least one of a host gateway antenna or a hosted gateway antenna;
wherein, on the vehicle, the encrypted hosted commands are unencrypted utilizing the hosted COMSEC variety to produce the unencrypted hosted commands, a hosted portion of a host/hosted payload is reconfigured according to the unencrypted hosted commands, unencrypted hosted telemetry associated with the hosted portion of the host/hosted payload is encrypted utilizing the hosted COMSEC variety to produce encrypted hosted telemetry, and the encrypted hosted telemetry is transmitted by the payload antenna,
receive the encrypted hosted telemetry from the payload antenna via a secure terrestrial link and at least one of the host gateway antenna or the hosted gateway antenna; and
decrypt the encrypted hosted telemetry utilizing the hosted COMSEC variety to produce unencrypted hosted telemetry.

19. A secure enclave configured to operate within a host spacecraft operations center (SOC), the secure enclave being configured to:
receive at least one request comprising service specifications from a hosted user;
generate unencrypted hosted commands according to the service specifications;
encrypt the unencrypted hosted commands by utilizing a hosted communication security (COMSEC) variety to produce encrypted hosted commands;
transmit the encrypted hosted commands to at least one of a host payload antenna or a hosted payload antenna on a vehicle via a secure terrestrial link and at least one of a host gateway antenna or a hosted gateway antenna;
wherein, on the vehicle, the encrypted hosted commands are unencrypted utilizing the hosted COMSEC variety to produce the unencrypted hosted commands, a hosted payload is reconfigured according to the unencrypted hosted commands, unencrypted hosted telemetry associated with the hosted payload is encrypted utilizing the hosted COMSEC variety to produce encrypted hosted telemetry, and the encrypted hosted telemetry is transmitted by at least one of the host payload antenna or the hosted payload antenna,
receive the encrypted hosted telemetry from at least one of the host payload antenna or the host payload antenna via a secure terrestrial link and at least one of the host gateway antenna or the hosted gateway antenna; and
decrypt the encrypted hosted telemetry utilizing the hosted COMSEC variety to produce unencrypted hosted telemetry.

20. The secure enclave of claim 19, wherein the vehicle is one of a satellite, an aircraft, an unmanned aerial vehicle (UAV), or a space plane.

* * * * *